(12) United States Patent
Shikhmanter et al.

(10) Patent No.: US 10,516,476 B2
(45) Date of Patent: Dec. 24, 2019

(54) SYSTEMS AND METHODS FOR MANAGING MULTILAYER COMMUNICATION NETWORKS

(71) Applicant: SEDONASYS SYSTEMS LTD, Raanana (IL)

(72) Inventors: Yona Shikhmanter, Hod Hasharon (IL); Ornan Alexander Gerstel, Herzliya (IL); Gal Afriat, Hadera (IL); Vladimir Miliavsky, Petah Tikva (IL)

(73) Assignee: SEDONASYS SYSTEMS LTD, Raanana (IL)

( * ) Notice: Subject to any disclaimer, the term of this patent is extended or adjusted under 35 U.S.C. 154(b) by 0 days.

(21) Appl. No.: 16/379,838

(22) Filed: Apr. 10, 2019

(65) Prior Publication Data
US 2019/0238220 A1 Aug. 1, 2019

Related U.S. Application Data

(62) Division of application No. 15/516,895, filed as application No. PCT/IL2015/050995 on Oct. 6, 2015, now Pat. No. 10,313,005.

(60) Provisional application No. 62/150,302, filed on Apr. 21, 2015, provisional application No. 62/060,583, filed on Oct. 7, 2014.

(51) Int. Cl.
| | | |
|---|---|---|
| *H04Q 11/00* | (2006.01) | |
| *H04B 10/038* | (2013.01) | |
| *H04L 12/64* | (2006.01) | |
| *H04L 12/701* | (2013.01) | |
| *H04L 12/24* | (2006.01) | |
| *H04L 12/26* | (2006.01) | |
| *H04L 12/703* | (2013.01) | |

(52) U.S. Cl.
CPC ....... *H04B 10/038* (2013.01); *H04L 12/6418* (2013.01); *H04L 41/0668* (2013.01); *H04L 43/0882* (2013.01); *H04L 45/00* (2013.01); *H04L 45/28* (2013.01); *H04Q 11/0066* (2013.01); *H04Q 2011/0073* (2013.01); *H04Q 2011/0083* (2013.01)

(58) Field of Classification Search
CPC .................................................. H04Q 11/0071
See application file for complete search history.

(56) References Cited

U.S. PATENT DOCUMENTS

| | | | | |
|---|---|---|---|---|
| 6,768,746 B1* | 7/2004 | Coltro | ............... | H04Q 11/0478 370/466 |
| 7,542,675 B1* | 6/2009 | Graves | ............... | H04Q 11/0005 398/45 |
| 8,483,560 B2* | 7/2013 | Miyaji | ............... | H04B 10/0771 398/15 |
| 2013/0259467 A1* | 10/2013 | Kang | ................. | H04Q 11/0067 398/5 |
| 2015/0125149 A1* | 5/2015 | Gao | .................... | H04J 14/0246 398/58 |

* cited by examiner

*Primary Examiner* — Nathan M Cors
(74) *Attorney, Agent, or Firm* — Soroker Agmon Nordman

(57) ABSTRACT

A system for mapping a multilayer network having a server layer and a client layer is provided. The system includes a framework configured for comparing information obtained from a first traffic counter of a client port to information obtained from a second traffic counter of a server port to thereby determine if the client port and the server port are linked.

5 Claims, 23 Drawing Sheets

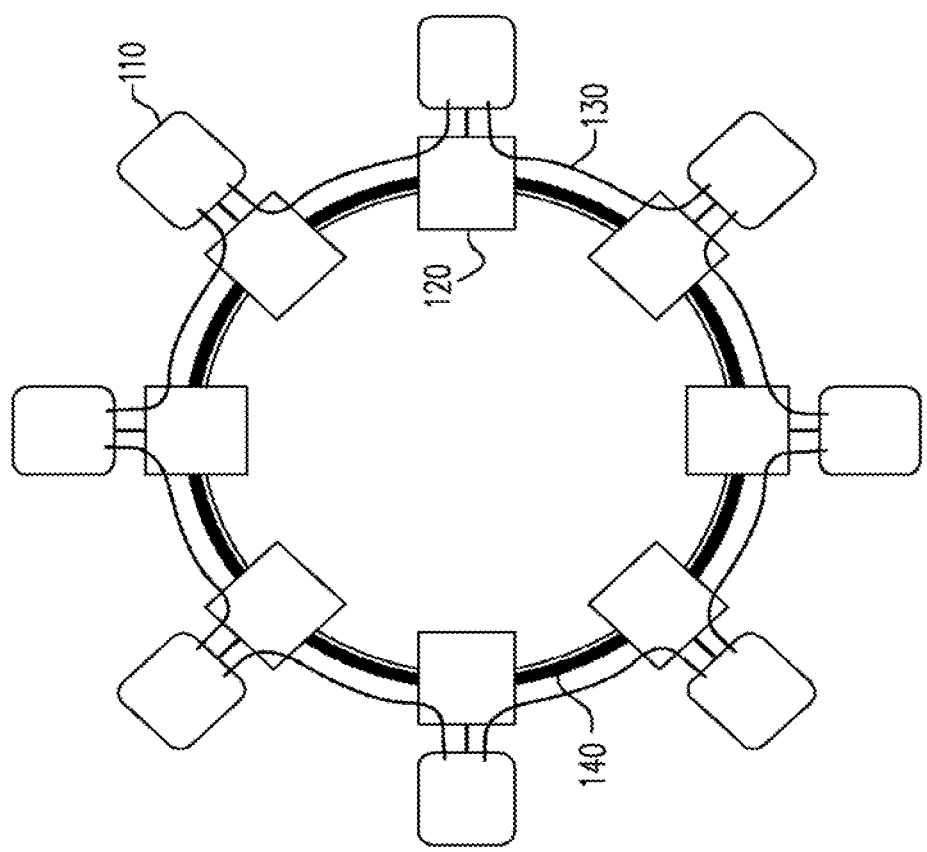

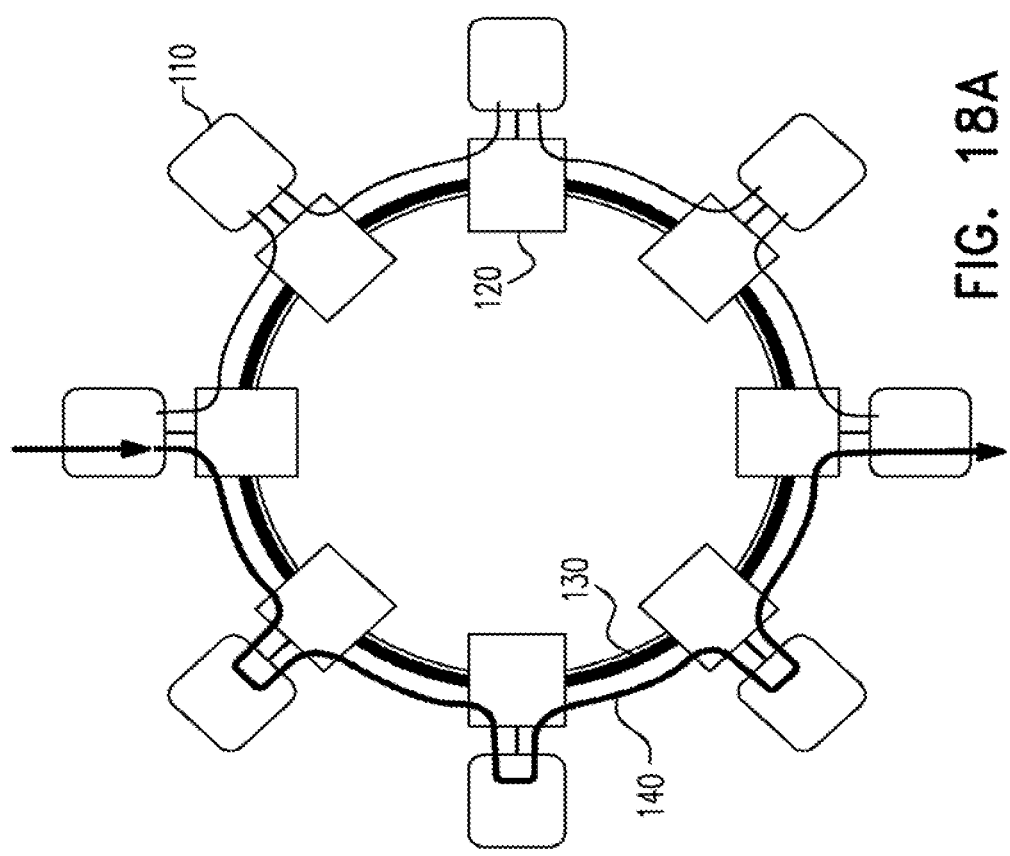

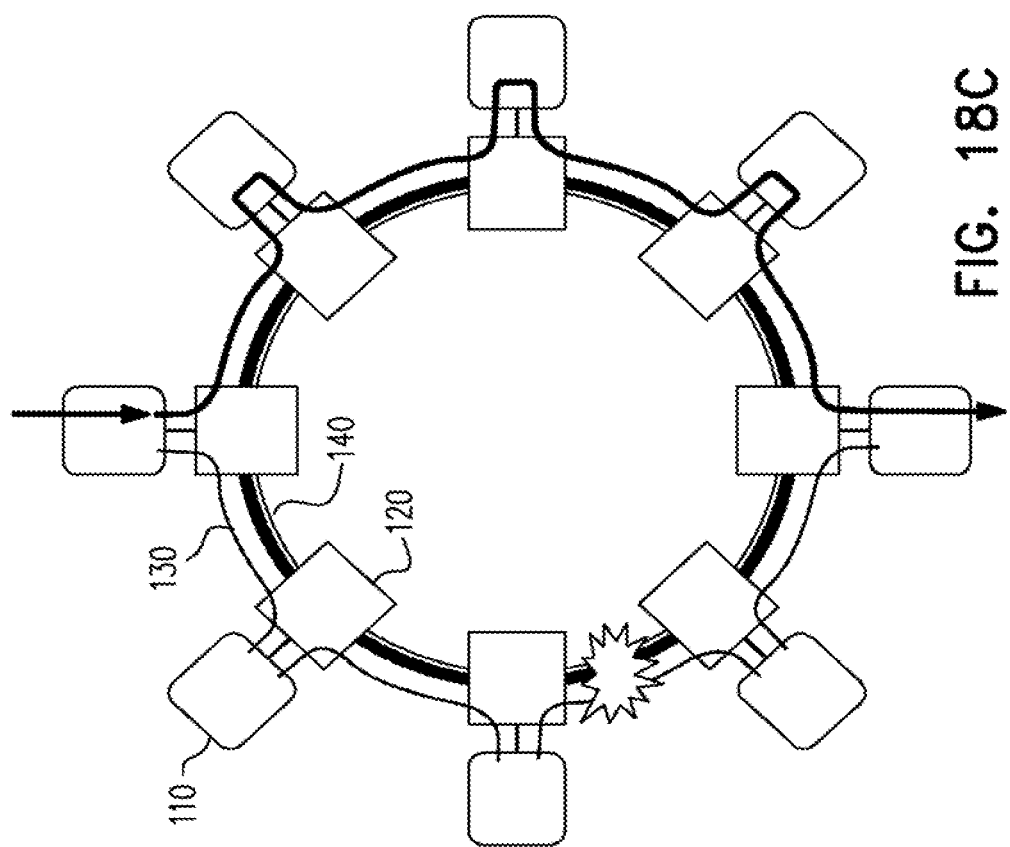

SYSTEMS AND METHODS FOR MANAGING MULTILAYER COMMUNICATION NETWORKS

FIELD AND BACKGROUND OF THE INVENTION

The present invention relates to systems for managing multi-layer communication networks. Embodiments of the present invention relate to a framework for mapping interconnections between layers of the multi-layer communication network (cross-layer mapping) and managing communication failures in the multi-layer network.

Decades ago, the rise in demand for telephony services spurred on the deployment of high capacity optical fiber networks. The subsequent rise in demand for Internet services resulted in leveraging of such optical networks for transmission of IP packets in an IP-over-Optical communication scheme. Such a multi-layer configuration utilizes the IP routers for controlling networking functions and the optical network for providing high throughput communication paths between the IP routers.

FIG. 1 illustrates an example of a multi-layer network which includes an Internet Protocol (IP) layer connected over an optical layer (e.g. Dense Wavelength Division Multiplexing—DWDM technology). Multi-layer networks can also include an additional a middle layer of Time division Multiplexing (TDM) switches, such as defined by Optical Transport Networking (OTN), or alternatively, a packet-optical or Ethernet layer instead of an IP layer.

Since such networks carry extremely large amounts of communication traffic, and are widely spread across multiple geographical locations, any connectivity failure at the IP or optical layers can impact a large amount of users. As such, multi-layer networks need to recover rapidly and efficiently from a failure in order to provide service continuity to the user.

In an IP-over-Optical multi-layer network, a link between routers of the IP layer (FIG. 1) is established by an optical path between optical switches (also referred to herein as optical routers or nodes) of the optical layer (FIG. 1). Failure of an optical path can be restored by rerouting the optical path around the failure (to restore connectivity between IP routers), while failure of an IP path can be restored by routing communication traffic through different IP routers.

There are several restoration framework types for recovering communication in an event of an optical and/or IP communication failure: (i) pure optical frameworks, in which the decision to restore optical paths is controlled by the optical layer; (ii) multi-layer frameworks that are biased towards use of distributed signaling to reroute optical connections at a time of a failure based on decisions taken in distributed fashion by the IP routers; and (iii) centrally controlled multi-layer frameworks which can reroute connections by instructing the router to re-signal the connection or by instructing the optical nodes to perform the reroute.

A pure optical framework can rapidly restore optical routing, however, the restoration path established by the optical layer may not meet the demands of the IP layer—for example its latency could be too high to be useful for the IP layer. In addition, optical restoration is only effective when the failure is in the optical domain and as such it does not take into account failures in the IP layer. Finally, when the optical failure is repaired and the system reverts to normal mode (working path), the switch from the restoration path to the repaired working path without coordination with the IP layer may result in unnecessary traffic outages.

A distributed multi-layer framework relies on signaling between the IP and optical layers and assumes that the IP router takes into account the constraints of optical connections, and is capable of negotiating these constraints with the optical layer should the most stringent constraints result in non-usable optical paths. This requires provisioning of multiple "path options" to the router, which creates a cumbersome process and a rigid negotiation process between the layers, which follows a fixed order of increasingly relaxed constraints irrespective of the actual failure. This is a time consuming process and creates churn since some restoration path options can be irrelevant to the actual failure. The distributed multi-layer framework also assumes that the decision to restore IP links via the optical layer is statically determined a-priori. In practice, some links could stay down without impacting traffic, while others must be restored on-the-fly, based on current traffic conditions. A distributed multi-layer framework poorly addresses multi-vendor networks, and multi-domain networks due to a lack of standards between vendors and networks.

A centrally controlled multi-layer framework is advantageous in that it can decide which connections to restore and how to restore them based on global understanding of the network and its current needs, however, it relies on the availability of the central controller, its site and server and the communications network to it and is thus more vulnerable. Lack of central controller availability can result in severe traffic loss and service contract violation. In addition, a centralized controller can experience signaling load and processing load during a large scale failure, causing slow recovery. Due to these limitations, network operators are reluctant to adopt multi-layer framework solutions.

In efforts of addressing the limitations of the above described restoration approaches, the present inventor has devised a framework for managing optical restoration without negatively impacting communication through the IP layer following restoration and following subsequent reversion to the working path.

SUMMARY OF THE INVENTION

According to one aspect of the present invention there is provided a system for mapping a multi-layer communication network having a server layer and a client layer, the system comprising a framework configured for comparing information obtained from a first traffic counter of a client port to information obtained from a second traffic counter of a server port to thereby determine if the client port and the server port are linked.

According to further features in preferred embodiments of the invention described below, the information is used to model the traffic counts of the client port and the server port over a time period.

According to still further features in the described preferred embodiments the model is a slope of the traffic counts of the client port and the server port over the time period.

According to still further features in the described preferred embodiments the information is used to construct a graph or pattern of traffic counts of the client port and the server port over a predetermined time period.

According to still further features in the described preferred embodiments the pattern includes at least one spike in the traffic count of the client port and the server port, the spike indicating a local maximum point in the graph of traffic counts.

According to still further features in the described preferred embodiments the slope is of a line having a minimum sum of distances from the traffic counts over the time period.

According to still further features in the described preferred embodiments the line is obtained using a minimum squares algorithm.

According to still further features in the described preferred embodiments the information is used to determine an averaged difference between traffic counts of the first traffic counter and the second traffic counter.

According to another aspect of the present invention there is provided a system for managing resources in a multi-layer communication network, the system comprising a framework configured for identifying client ports of a single link bundle that are routed through the same path of a server layer and using the clients ports interchangeably to reroute traffic.

According to still further features in the described preferred embodiments the client ports have substantially the same capacity.

According to another aspect of the present invention there is provided a system for managing a communication failure in a multi-layer communication network, the system comprising a framework configured for: (a) identifying a communication path failure in a server layer of the multi-layer communication network, the communication path failure resulting in communication failure between nodes of a client layer of the multi-layer communication network; (b) identifying communication restoration paths in the server layer capable of restoring communication between the nodes of the client layer; and (c) using a restoration regimen based on a network state to selectively establish each of the communication restoration paths.

According to still further features in the described preferred embodiments the restoration regimen sets an order of establishing each of the communication restoration paths.

According to still further features in the described preferred embodiments the restoration regimen sets a time delay of establishing each of the communication restoration paths.

According to still further features in the described preferred embodiments the framework is further configured for preventing rerouting of communication traffic in the client layer.

According to still further features in the described preferred embodiments the framework is further configured for (d) restoring a portion of the communication restoration paths in the server layer thereby partially restoring communication traffic between the nodes of the client layer.

According to still further features in the described embodiments, the server layer is an optical layer and the client layer is an IP layer.

According to another aspect of the present invention there is provided a system for managing a multi-layer communication network, the system comprising a framework configured for: (a) providing nodes of a server layer of the multi-layer communication network with instructions for restoring a communication failure in the server layer; and (b) periodically modifying the instructions in response to network state of a client layer of the multi-layer communication network.

According to still further features in the described preferred embodiments the instructions are stored in the nodes of the server layer or a central controller.

According to still further features in the described preferred embodiments the instructions identify a communication restoration path for restoring the communication failure in the server layer or client layer constraints for setting up the restoration path.

According to still further features in the described preferred embodiments the server layer is an optical layer and the client layer is an IP layer.

According to another aspect of the present invention there is provided a system for mapping a multi-layer communication network having a server layer and a client layer, the system comprising a framework configured for: (a) removing a client port of a link in a multi-link bundle interconnecting two nodes of the client layer, the removing being under conditions in which a capacity of the multi-link bundle exceeds communication traffic demand between the two nodes of the client layer, following the removing; and (b) identifying a server port of the server layer that loses communication thereby mapping the client port to the server port.

According to still further features in the described preferred embodiments the removing is effected by switching off the client port.

According to still further features in the described preferred embodiments the loss of communication in the server port is indicated by a traffic counter of the server port.

According to still further features in the described preferred embodiments the conditions are identified by the system.

According to still further features in the described preferred embodiments the conditions are created by the system by first adding a new link between the two routers using existing router interfaces and sharing traffic load over the link.

According to still further features in the described preferred embodiments the system creates an additional link in the multi-link bundle thereby increasing the capacity of the multi-link bundle to exceed the communication traffic demand.

According to still further features in the described preferred embodiments the server layer is an optical layer and the client layer is an IP layer.

According to another aspect of the present invention there is provided a system for mapping a multi-layer communication network having a server layer and a client layer, the system comprising a framework configured for: (a) mapping source and destination sites at the client layer and at the server layer; and (b) identifying client node ports of the client layer and server node ports of the server layer that serve an identical pair of source and destination sites.

The present invention successfully addresses the shortcomings of the presently known configurations by providing a system which is capable of mapping a multi-layer communication network and capable of restoring communication failures in multi-layer networks while minimizing impact on communication through the network during and following restoration and network recovery. The present system does not require an inter-layer control plane or manual reconfiguration of the client layer routers and is operable with a wide range of vendors/network-types.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 17 illustrates a network having several equal-length optical links.

FIGS. 18a-c illustrate service route in the network of FIG. 17 (FIG. 18a), an optical recovery from failure via the existing IP layer path (FIG. 18b) and routing of service over a different IP path (FIG. 18c).

DESCRIPTION OF THE PREFERRED EMBODIMENTS

Figure 1:
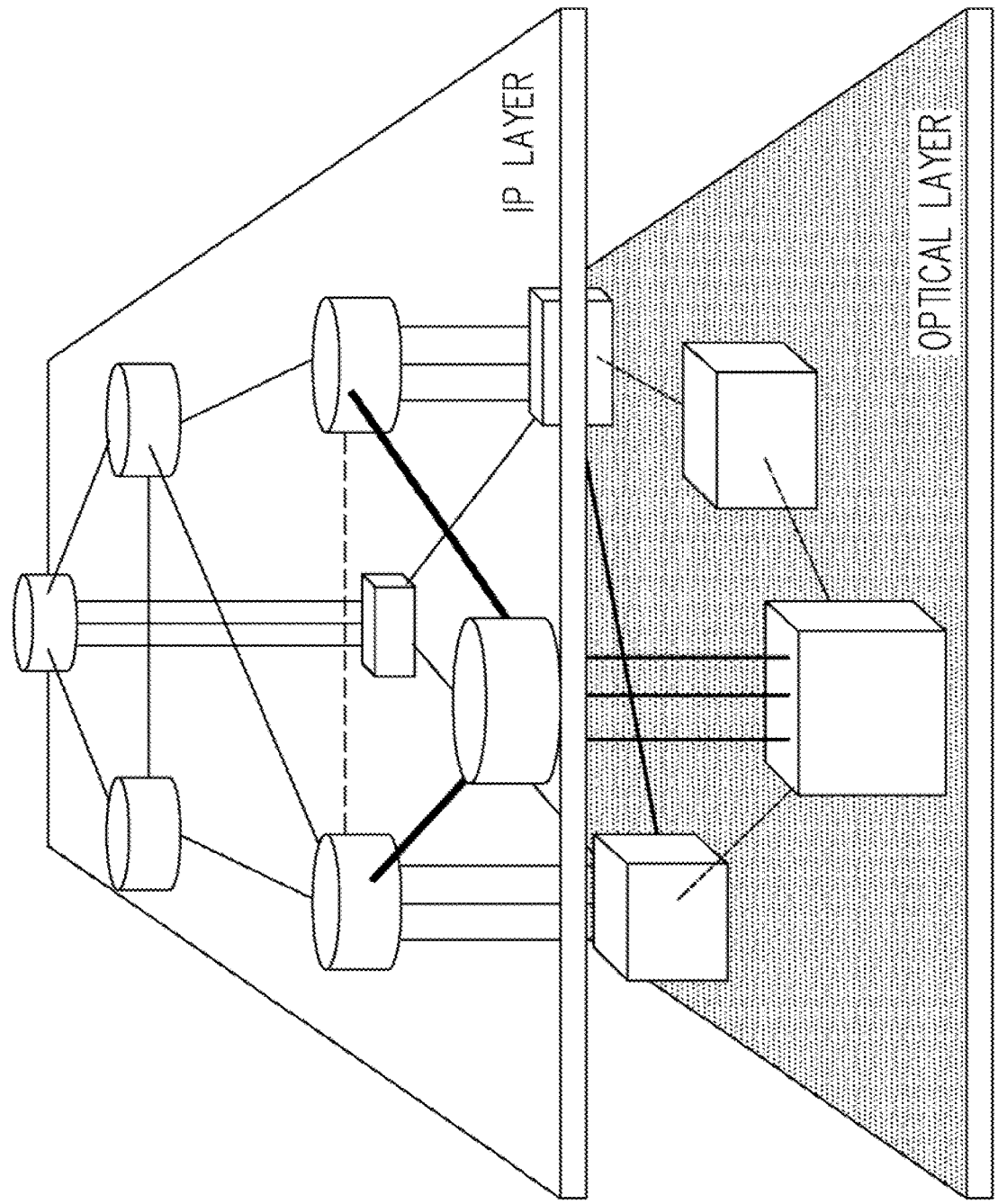
FIG. 1 illustrates an IP-over-Optical multilayer communication network.

The present invention is of a system which can be used to manage communication failures in multi-layer communication networks. Specifically, the present invention can be used to restore communication path failures in IP-over-Optical networks.

The principles and operation of the present invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Present day multilayer communication networks include a client layer (e.g. IP layer) overlaid on top of a preexisting server layer (e.g. optical layer). Since such networks were not designed from the ground up as an integrated solution, management of multi-layer networks requires separate control over each network layer oftentimes without taking into consideration the effects of configuration changes in one layer on communication through the connected layer. Although management tools for controlling both the server and client layers (e.g. HP OpenView) can in theory provide a more integrated management solution, such tools are inherently limited by differences in vendor equipment in server and client layers and the reluctance of operators to modify IP layer configurations.

While reducing the present invention to practice, the present inventor created a system which can provide centralized restoration of communication failures in multi-layer networks without necessarily requiring control over client layer routers.

Thus, in effect, the present system provides centralized management through server layer control. In order to provide such functionality, the present system is configured for:

(i) mapping interconnectivity between server layer nodes and client layer nodes to define communication paths between specific server layer and client layer ports;

(ii) predefining server layer communication paths for restoring a server layer or a client layer communication failure based on network state and (i);

(iii) predefining the order of restoration for server layer communication paths or the delay before restoration is attempted;

(iv) changing the predefined restoration settings when traffic conditions change;

(v) determining restoration paths and their order based on global simulation of network behavior and global constraints such as end-to-end latency or required support for multiple simultaneous failures;

(vi) setting thresholds for the minimum number of IP links between a pair of routers that must be up before traffic starts flowing between them; and (vii) determining the maximum allowed latency of an IP link, given a user configured end to end latency, and using it to define restoration path constraints.

Such features of the present system can provide the following functionality:

(a) low-cost restoration of communication failures in the server or client layers;

(b) faster service restoration compared to other approaches that do not control the order of restoration;

(c) reduced traffic outage during the restoration process compared to other approaches;

(d) reduced traffic outage during the reversion process compared to other approaches;

(e) support for multi-vendor networks that do not support client-server signaling (UNI); and (f) SLA assurance during failures with respect to end to end latency and other service level constraints;

These functions can be provided by a framework (application-specific software) running on a server connected to the high speed multi-layer communication network via a dedicated low speed network for the purpose of management and control which is often referred to as a "data communication network" (DCN).

Figure 2:
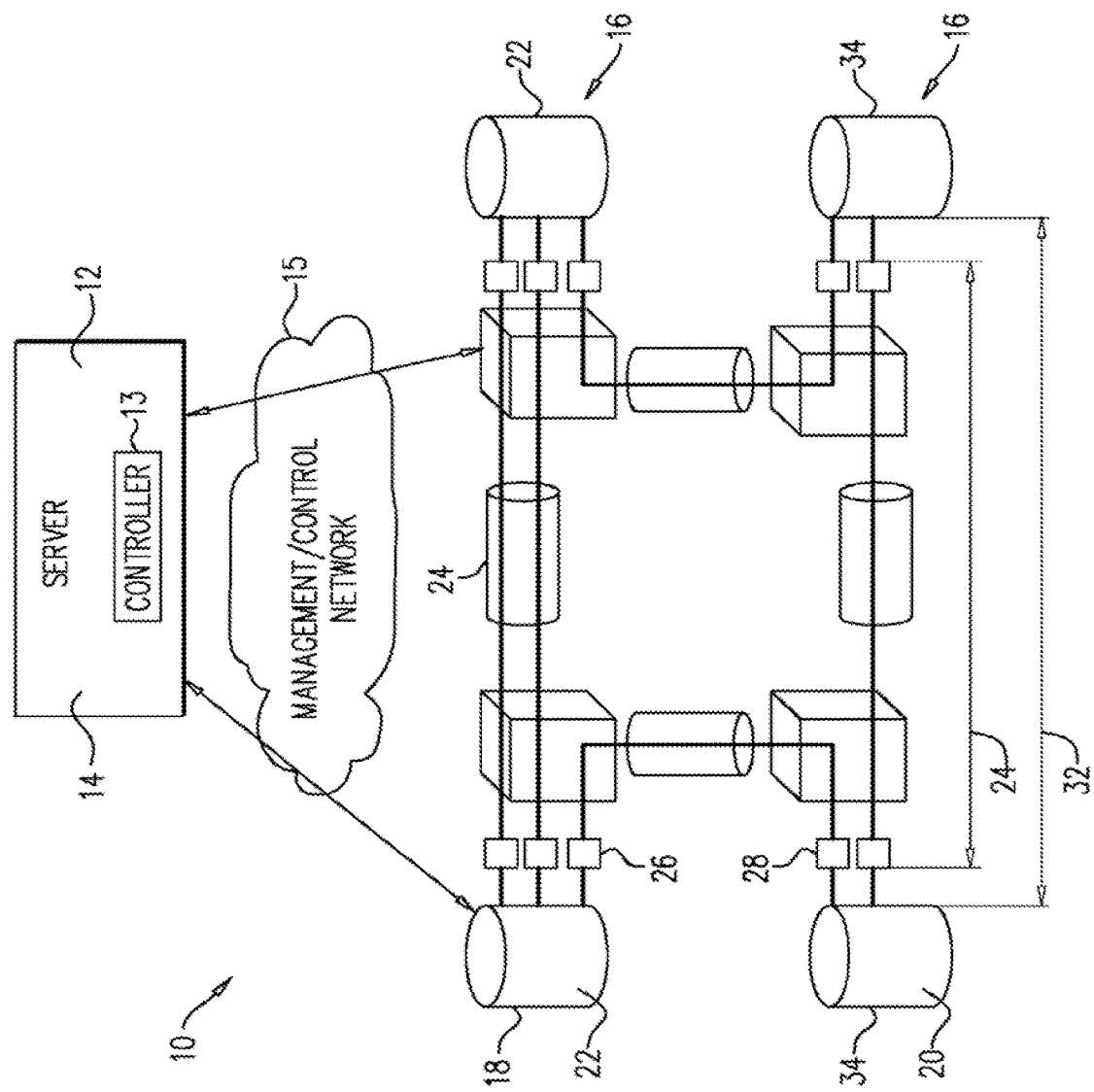
FIG. 2 is a block diagram illustrating the present system and its connectivity to the multi-layer network servers.

FIG. 2 is a block diagram illustrating the present system which is referred to herein as system 10. System 10 includes server 12 (e.g. an HP blade server) which includes a central controller 13 and framework 14. Server 12 is a part of, or is in communication with multi-layer communication network 16 through a management/control network 15. Multi-layer communication network 16 includes a server layer 18 (e.g. Optical) connected to a client layer 20 (e.g. IP). Server layer 18 includes server routers 22 (e.g. optical routers) interconnected via communication paths 24 (e.g. optical fibers). Routers 22 include ports 26 which are connected to ports 28 of client routers 30 (e.g. IP routers) to establish optical links 32 between client routers 34.

Figure 4:
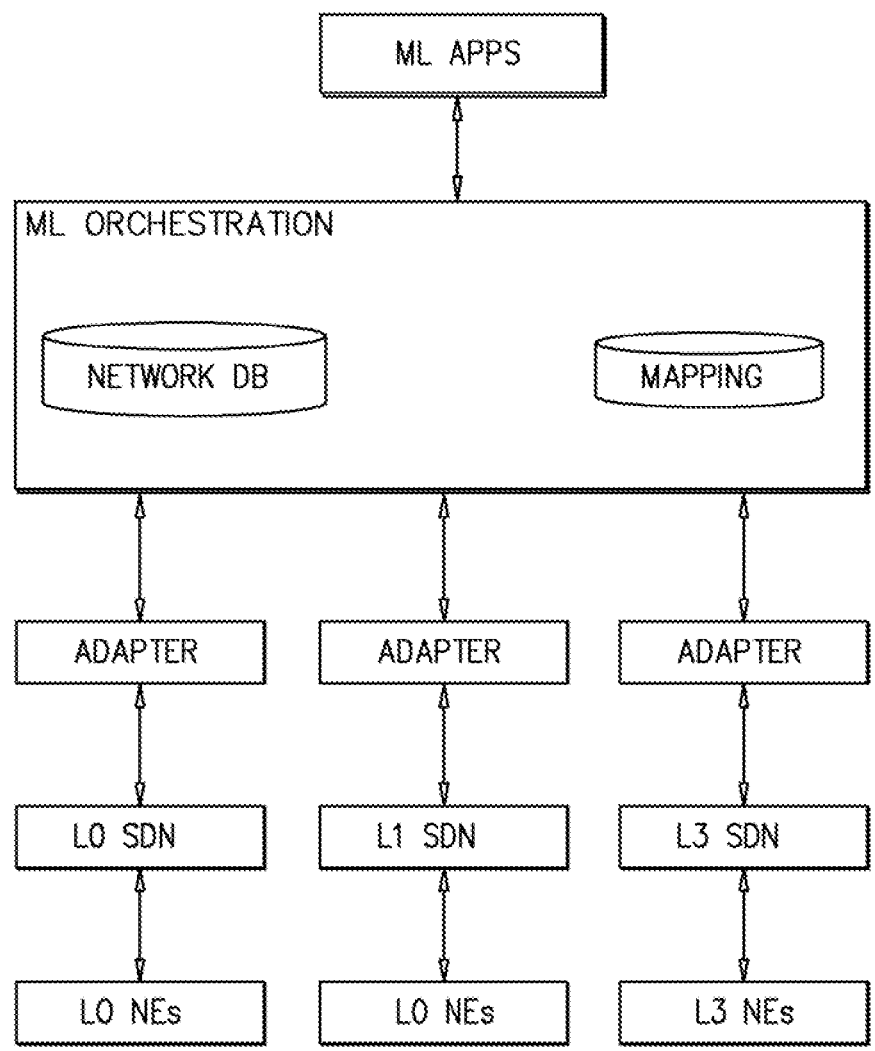
FIG. 4 illustrates exemplary implementations of the multi-layer centralized control according to the present invention.

Referring to FIG. 4, framework 14 can include an orchestration module that includes a database that represents the multi-layer network, its nodes, links, and traffic statistics. It also includes a mapping database that captures which client port maps to which server port. This orchestrator has software interfaces to multiple adapters, each of which adapts to a vendor specific format of the "northbound interface" (NBI) of the central controller that typically controls the equipment of this vendor. The orchestrator interfaces to several multi-layer applications using another software interface.

System 10 functions continuously to restore communication failures and to provide monitoring and management of multi-layer network 16 during normal network behavior. As used herein, "communication failures" refers to any abnormal network behavior (communication slow down, packet loss, link down event or increased error rate on a link) caused by partial or full failure of communication equipment (e.g. communication fibers, optical gear, routers etc).

Thus, according to one aspect of the present invention there is provided a system for managing a communication failure in a multi-layer communication network. The multi-layer network can be any communication network composed of at least a server layer (e.g. optical communication layer) and a client layer (e.g. IP communication layer).

The system of the present invention is configured for identifying a communication path failure in the server layer which results in a communication path failure between nodes of the client layer. Such a failure can be caused by severing of an optical fiber, failure of communication equipment such as server layer routers such as reconfigurable add/drop multiplexers (ROADMs) or ports or optical amplifiers. Identification of such failure is typically effected by both the client layer and server layer and reported to the communication system and to a central controller of the present system.

Once the communication path failure is identified and mapped to specific server and client layer routers and ports (mapping is further described hereinbelow), the system identifies communication restoration paths in the server layer which are capable of restoring communication between the affected nodes of the client layer. For example, in a multi-layer network having an optical server layer, such restoration paths are alternate optical paths that serve the affected client (IP) layer routers.

Once appropriate restoration paths are identified in the server layer, the present system applies a restoration regimen based on a network state to selectively establish each of the communication restoration paths. The regimen can be applied on the fly following a failure or it can be preset and stored on the server layer routers (as is described below with respect to normal network behavior) to be triggered following failure.

As used herein "network state" refers to the configuration of nodes and ports, the current traffic conditions, the current optical paths that have been established in the network, the current failures and any other data that affects the behavior of the network.

Restoration of a communication failure in a multi-layer network is effected by the present system via several, optionally chronologically overlapping steps, the description below described restoration in an IP-over-Optical network, note however, that such restoration also applies to other multi-layer network configurations, including multi-layer networks having more than two layers.

When an optical path linking two IP routers (FIG. 3a) fails (FIG. 3b), the IP layer detects the resulting failure and attempts to reroute all traffic through the shortest viable communication paths. At present, a typical IP layer is configured with sufficient communication capacity to manage such failures without causing congestion. However, a more efficient network in the future designed to rely on multi-layer restoration will not have the required communication capacity to manage such failures, and congestion may arise if the failure occurs during peak traffic hours. This only affects low priority traffic—high priority traffic will recover since the network provisions capacity to such traffic by design.

Figure 3A:
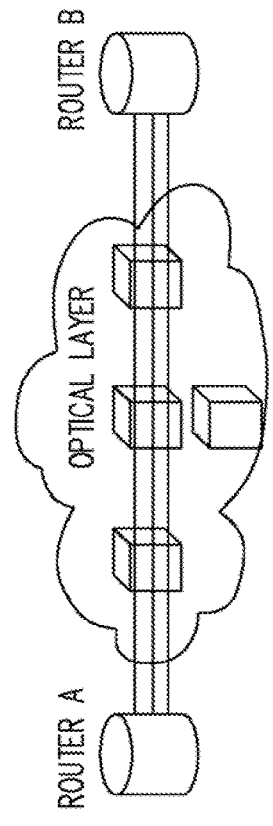
FIGS. 3a-d illustrate a link bundle between two IP routers and its restoration path.
Figure 3B:
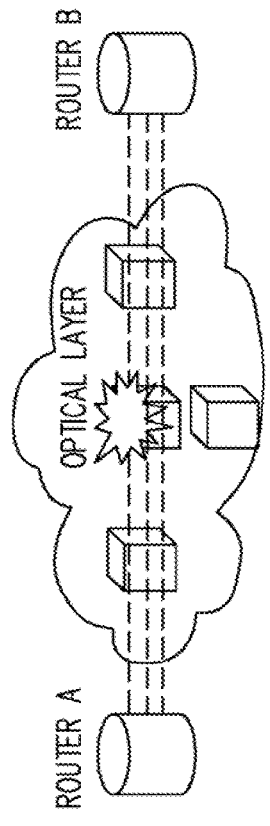
Figure 3C:
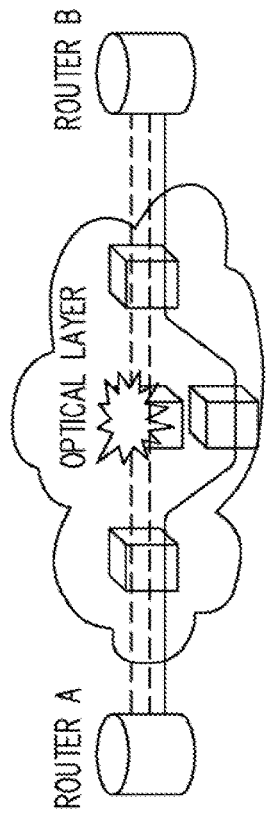
Figure 3D:
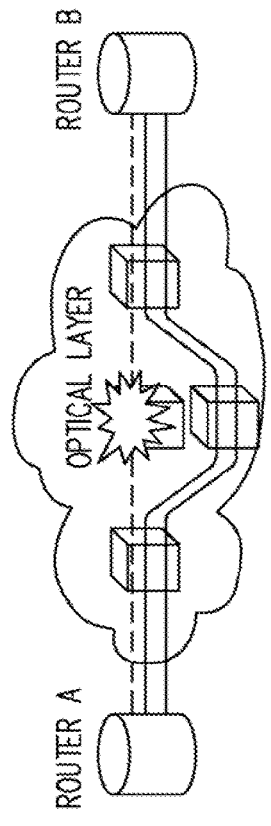

The present system will typically not interfere with attempts to reroute communication in the IP layer but will subsequently perform restoration through the optical layer, thereby eliminating the temporary congestion for low priority traffic. As is mentioned hereinabove, one embodiment of the present system provides the optical routers with instructions (an "alternate path" or restoration regimen dictated via configuration data) stored on optical routers and updated when conditions change. Such configuration data (which can be packaged as a file) can be provided on the fly and includes instructions as to the most suitable restoration path in the optical layer and the timing/order of restoration of each path. The optical layer will restore optical paths designated as optically restorable in an order determined by the instructions provided by the present system (FIG. 3c-d illustrate stepwise restoration of paths).

Timing/order of restoration can be effected using well known control plane mechanisms, for example using Generalized Multiprotocol Label Switching (GMPLS) or via a central controller of the optical system. The order is typically enforced by the optical system by introducing a delay (of several seconds) in the restoration of some of the optical paths.

The present system can alternatively directly control the restoration process following failure. Such direct control can be effected by issuing commands either to the network elements directly or to the controllers of the network elements of the restoration path and order of restoration.

Several scenarios of restoration can be effected by the present system:

(i) The central controller of the present system issues commands to the controller of the optical layer before a failure occurs (pre-provisioned restoration regimen), which immediately issues commands to the optical routers (typically called ROADMs). During failure, the optical routers autonomously restore a communication path;

(ii) The central controller issues the commands to the controller of the optical layer before a failure occurs. The controller of the optical layer does not immediately issue any commands to the optical routers, but only does so after the failure occurs;

(iii) The central controller issues the commands to the controller of the optical layer following a failure. The controller of the optical layer immediately issues the commands to the optical routers (post-failure restoration regimen);

(iv) The central controller issues the commands directly to the optical routers before a failure occurs. During failure, the optical routers autonomously restore path; or (v) The central controller issues the commands to the optical routers following failure.

The controller may decide to not restore other links in the bundle since the current traffic conditions do not require their restoration. These links will not be optically restored and therefore fail.

Figure 5:
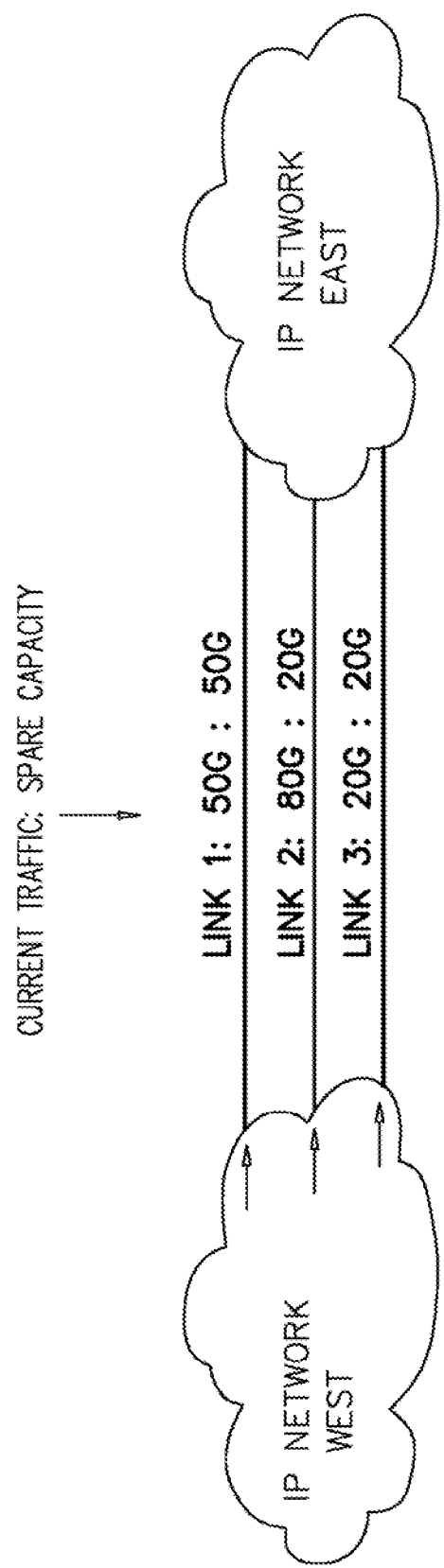
FIGS. 5-9 illustrate selective/stepwise restoration of optical path failure according to the teachings of the present invention.
Figure 6:
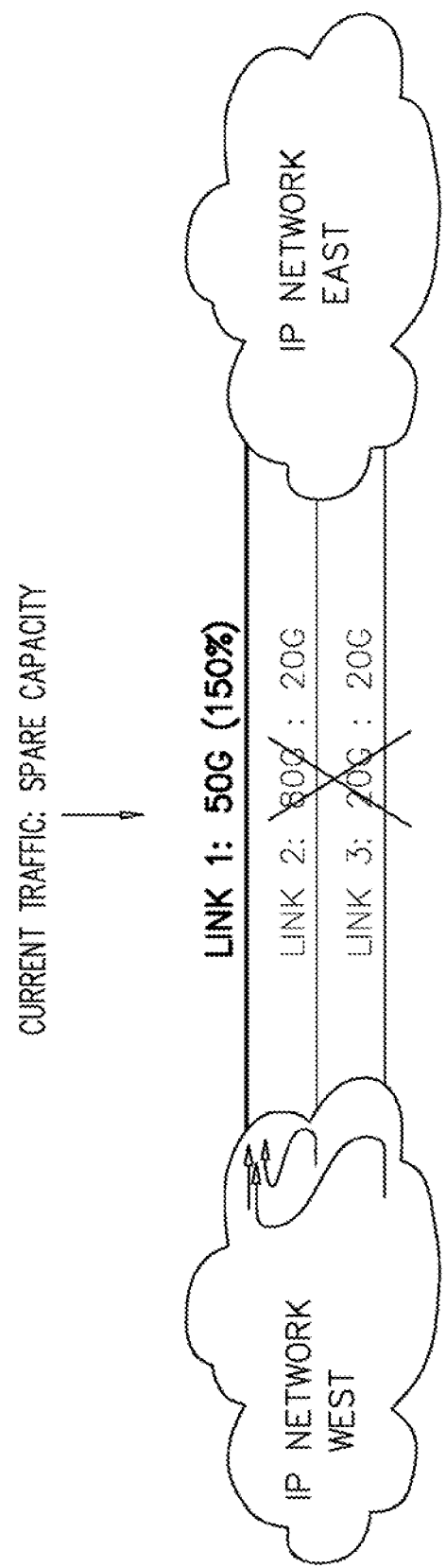
Figure 7:
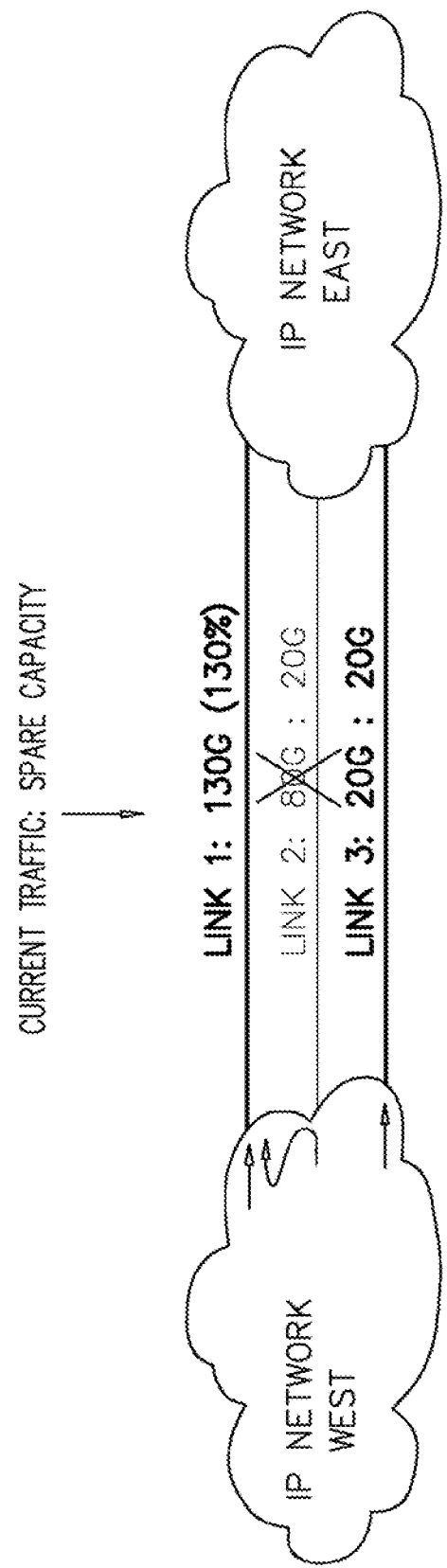
Figure 8:
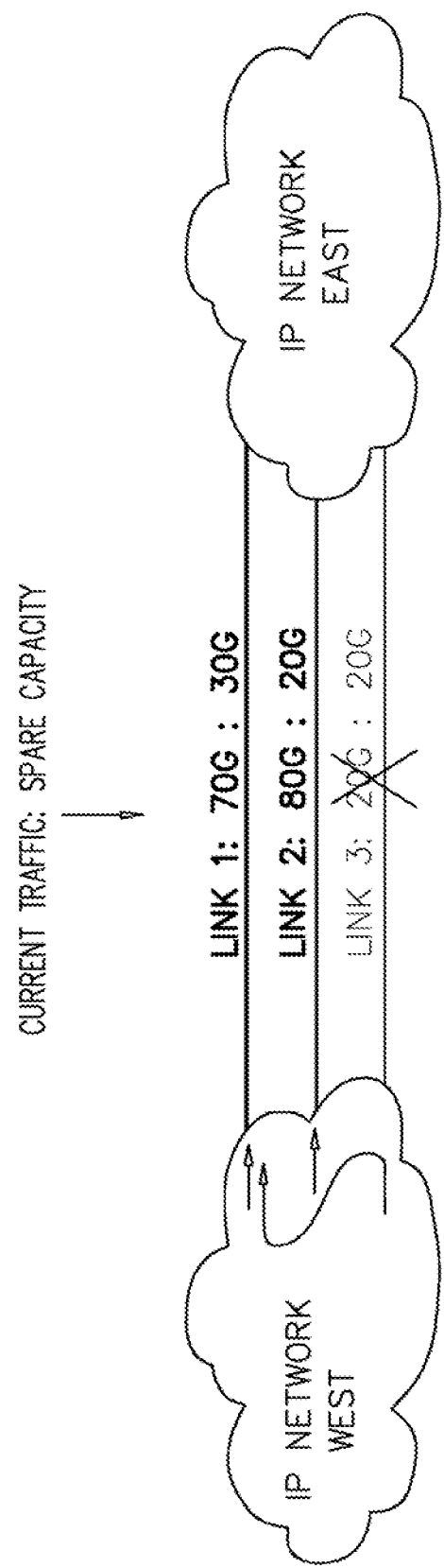

The order of restoration is important to ensure rapid recovery from a congested traffic state to an uncongested state. This is because some links have a higher impact on the recovery of traffic than other links. For example, failure of links that normally carry a significant amount of traffic may cause this traffic to be rerouted over other links that have little spare resources, resulting in congestion. Early recovery of these links will result in traffic reverting back to them, thereby removing congestion. On the other hand, if links that carry a light load are recovered first, their recovery will not significantly reduce congestion. This is demonstrated in the network shown in FIG. 5, in which two parts of an IP network (symbolized by clouds) are connected via 3 links. The current traffic over each link is captured by the first number shown next to the link name in the figure, while the remaining unused capacity is captured by the second number (e.g., Link 2 current supports 80 Gbps, while it has another 20 Gbps of capacity that remains unused). When a failure that impacts two of the links occurs in FIG. 6, all traffic is router over Link 1, which carries 150 Gbps traffic over a 100 Gbps link, causing significant temporary traffic congestion of 150% and subsequent traffic loss. When Link 3 is recovered by the optical layer, the IP layer may be configured in a way that will cause traffic from Link 2 to continue to be routed over Link 1 as shown in FIG. 7, in which case the congestion on Link 1 reduces to 130% but is still present, and this may continue for a few minutes until Link 2 is optically recovered and congestion disappears. The present system may choose a different restoration order, in which Link 2 is recovered first, thereby removing the congestion from Link 1 as shown in FIG. 8.

Figure 9:
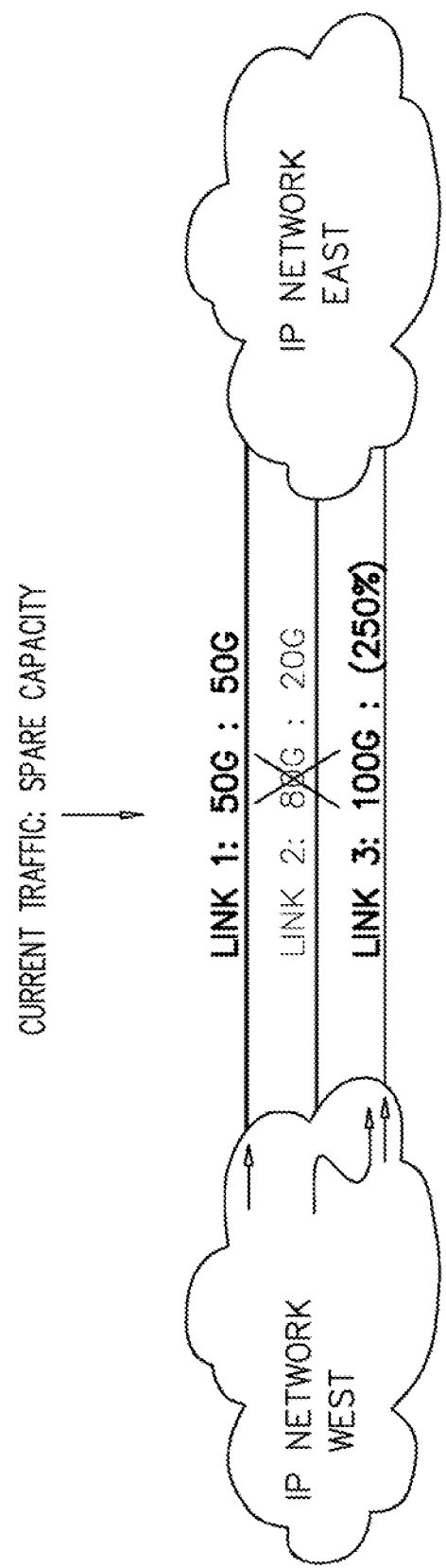

Moreover, restoring traffic in the wrong order may cause increased level of congestion and even loss of high priority traffic. For example, if a restored link enables a shorter path in the network for a significant amount of rerouted traffic, this link may become a bottleneck before other links are restored and cause more significant congestion than without it. Considering the example in FIG. 5 again, and the failure in FIG. 6, if optical restoration chooses to restore link 3 first, and the IP layer is configured in a way that will cause traffic from Link 2 to now be rerouted over Link 3 as shown in FIG. 9, then excessive congestion of 250% will occur on Link 3, causing more significant harm—and potentially the loss of high-priority traffic.

The pre-provisioned restoration regimen may be changed from time to time by the present system due to changes in IP layer traffic count patterns or due to changes in the resource usage or topology of the optical layer. In this case, the present system will re-provision the optical layer with the new regimen—a process that will typically have no impact on the current traffic.

The optical layer may fail to auto-restore some links set by the restoration regimen pre-provisioned by the present system, due to lack of resources. It may also fail to restore links due to control issues in the optical layer. Either way, it will typically communicate such restoration failure to the present system (e.g. trigger an alarm in the central controller). Alternatively, central controller may poll to see if the links have been restored. Such polling is important in cases where, for example, optical restoration attempts to restore a path repeatedly without success. In such a case central control will issue a request to the optical layer to abort the restoration process. Another example is when the optical layer does not realize that the path has failed and does not attempt to restore it, for example when the signal is degraded but not completely absent. In this case the IP layer will issue an alarm that the link is down, but the optical layer will issue no alarms.

Since the central controller is aware of the resource usage in the optical layer and of the overall network state, it can decide whether the failure is not optically restorable (for example, a router port failure), in which case it may invoke different restoration mechanisms to restore capacity (such as multi-layer port restoration, as is taught in Gerstel et al., IEEE Communications Magazine, January 2014).

If the failure is optically restorable, but not under the restoration regimen pre-provisioned by the present system, the system provisions a restoration path with a new set of constraints that may be still suitable for the IP layer—but more relaxed than the original restoration regimen. Since the central controller is aware of network state and real time communication needs of the IP layer, it can decide on the fly to relax the constraints for the optical path. It can also pick a set of constraints that are suitable for the specific type of the failure, a function which cannot be realized using prior-art distributed restoration approaches.

Thus, the present system can effectively deal with complex failures using a central control and defer the restoration of simple failures to the distributed control plane of the network, which cannot effectively deal with complex failures, such as, for example, dual failures of links.

Failed links that have not been restored by the present system (e.g. second link in the bundle shown in FIG. 3d), are identified and cataloged by the central controller via alarms or polling. Central controller may decide to restore the other links of this bundle first and delay restoration of this link by a few minutes. In some cases, since the first link of this bundle is restored quickly by the central controller, the impact of slower restoration of the second link will be acceptable. The decision of the central controller to restore the second link can be based on knowledge of the traffic traversing the link—either prior to the failure, or based on congestion on the restored link after the failure. It can also be based on the availability of spare resources in the optical layer and may be intentionally delayed to ensure that all critical traffic is already restored, before attempting to restore less critical links (so that the latter will not block the restoration of the former).

Some of the links may not be restored by the present system due to a lack of demand, i.e. current IP layer traffic conditions do not require that such links be active. However, if at a later point in time traffic increases to a point which requires activation of these links, the central controller, which is aware of this rise in traffic, will selectively restore such links based on demands.

The decision of the path used for restoring a failed IP link is based on constraints imposed on the restoration path by either the IP layer or optical layer. These constraints may be different between the normal path and the restoration path, however changing path constraints is often impossible for the paths that are automatically restored by the optical layer (approach (a)—without the collaboration of the IP layer). Such automatically restored paths either do not obey any constraints (an approach that may be too lenient and not fit the needs of the IP layer), or use the same constraints used for the normal path (an approach that may be too strict and not fit what the optical layer can do). For this reason, prior art approaches rely on the router to know how to relax the constraints for the optical path, but this is still insufficient, since these relaxation rules are statically provisioned on the router.

In some cases, the central controller will not only determine the constraints that the path must obey but also determine the details of the path, namely the explicit path in the optical layer, the specific wavelength to be used for the restoration path, and the specific regenerators used along the path. This is effected in order to avoid race conditions (on wavelength and regeneration resources) and excess calculations during a failure. This information may be calculated by the central controller directly or by consulting a path computation element (PCE). If such details are pre-provisioned in the optical layer a-priori, the central controller may alter these details based on changing conditions in the network.

The central controller may also determine the restoration priority of each optical connection, thereby controlling the order of restoration activities. If IP links are restored in the wrong order, unwanted transient traffic loss may occur. This is another advantage of the present system over prior art approaches. For example, a link bundle which includes three links (FIG. 3a) will fail following an optical communication failure (FIG. 3b). Consequently the traffic carried by the bundle will be quickly rerouted elsewhere in the IP network and recover. If high priority (critical) traffic occupies more than one link of this bundle and optical restoration temporarily restores only one link (FIG. 3c) the high priority traffic will be rerouted by the IP layer to use this link (since it is on the shortest path for this traffic) thus causing undesired traffic congestion and loss. Only restoration of the second link of the bundle (FIG. 3d) will restore high priority traffic to normal. To avoid this scenario, the central controller will provision configuration data in the optical routers instructing them to not turn on the bundle unless two of the three links are up. The ability to turn on the bundle only when a specific number of links are active is a feature of present day routers, however, this setting is static and cannot be changed when high priority traffic no longer requires two links.

Even more complex scenarios can also be handled by the present system. For example, the present system can dictate an order of restoration across links connecting different routers (not in the same bundle) based on simulating the behavior of the network after the recovery of each link. As mentioned earlier, the order can typically be enforced a-priori by setting the restoration priority of connections.

The restoration scheme described herein can be extended to a network with more than two layers. As is described above, the central controller of the present system decides for every IP node (router) whether traffic is automatically restored at the optical layer or not. Since the IP layer always restores traffic automatically, the decision not to optically restore traffic is equivalent to a decision to restore it at the IP layer. Therefore, the central controller effectively decides for every link at what layer traffic should be restored in the event of a link failure. Thus, in a three layer network, the central controller can decide that traffic will be restored at the top layer, the middle layer or the bottom layer. Based on traffic conditions, the central controller may decide to change the layer at which traffic is restored. In addition, the central controller may decide after a failure to restore additional capacity at different layers.

Following repair of the failed optical link (e.g. physical repair of a severed optical fiber), the network has to be reverted back to its normal state. As such, the optical connections that were rerouted over their restoration paths should be rerouted back to the shorter, pre-failure, path which is typically (but not always) the original path before the failure.

Rerouting an optical path without coordination with the IP layer implies a traffic hit in the IP layer since this process will take IP links down, and cause sudden re-convergence of the IP topology. As a result, operators will not allow such events to happen automatically, resulting in more complex operation and prolonged abnormal network states.

The present system effectively deals with this problem by carefully coordinating between the network layers to minimize the impact of this process.

When the communication failure is repaired, the central controller will identify the newly repaired optical link (typically by the disappearance of the alarm condition triggered by the original failure). The central controller will then consider current traffic conditions (network state) and decide whether the network can tolerate a temporary outage of certain links, by simulating network behavior under this outage.

If such an outage is possible without causing congestion, the central controller will pick an IP link, slowly drain the link by increasing the cost of the routing metric for the link (termed "costing out the link" and is common manual practice today when maintaining a link).

Once the link is drained, the central controller will remove it from the active IP links and order the optical layer to reroute to the original (pre-failure) route or to the best route available at the time (this can be based on operators' policy). Once the link is up, the central controller will then reinstate service through this optical path.

As is mentioned hereinabove, the present system also manages the network during normal network operation.

During normal network operation (no failure detected) the central controller monitors the network and from time to time changes several properties of the optical links and IP ports by provisioning configuration data to the network nodes and/or their controllers.

For example, the central controller determines which IP links should be automatically restored by the optical layer, over what path they should be restored, and in what order they should be restored.

To decide which IP links should be restored, the central controller monitors the traffic on each IP adjacency—one or more IP links, typically configured as a "link bundle". Each link connects a pair of specific ports of connected IP routers and is supported by an optical path (FIG. 3a).

For example, the central controller may pre-provision a restoration regimen to the optical layer to restore only one link of a bundle in cases where such a single link suffices to support the critical traffic. This can be affected by pre-configuring the "path head-end", which is the optical node at one end point of the optical path. As a result, the network will behave as shown in FIG. 3c.

If the critical traffic exceeds the capacity of a single link, the central controller will re-provision a new restoration regimen to the optical layer, to automatically restore a second link of the link bundle. As a result, the network will behave as shown in FIG. 3d.

When changing the number of links pre-configured to be optically restored, the central controller must also provision the IP routers at both ends with the minimum number of links needed to bring the adjacency up. This attribute exists on core routers today—for example on Cisco's CRS-1 router. It will be provisioned to 1 in the former case (FIG. 3c) and 2 in the latter case (FIG. 3d).

Conversely, if the critical traffic is below the link threshold, the central controller may re-configure the optical layer to not restore the second link of the bundle.

The decision to selectively restore one or more optical links in a bundle is based on measurement of the traffic load of the bundle and standard threshold techniques based on hysteresis and is effected while the link is up without an impact on traffic.

As is mentioned hereinabove, the present system is also configured for mapping connectivity between the server and client layer. Mapping can be effected by a framework running on a server connected to the multi-layer communication network.

Figure 11:
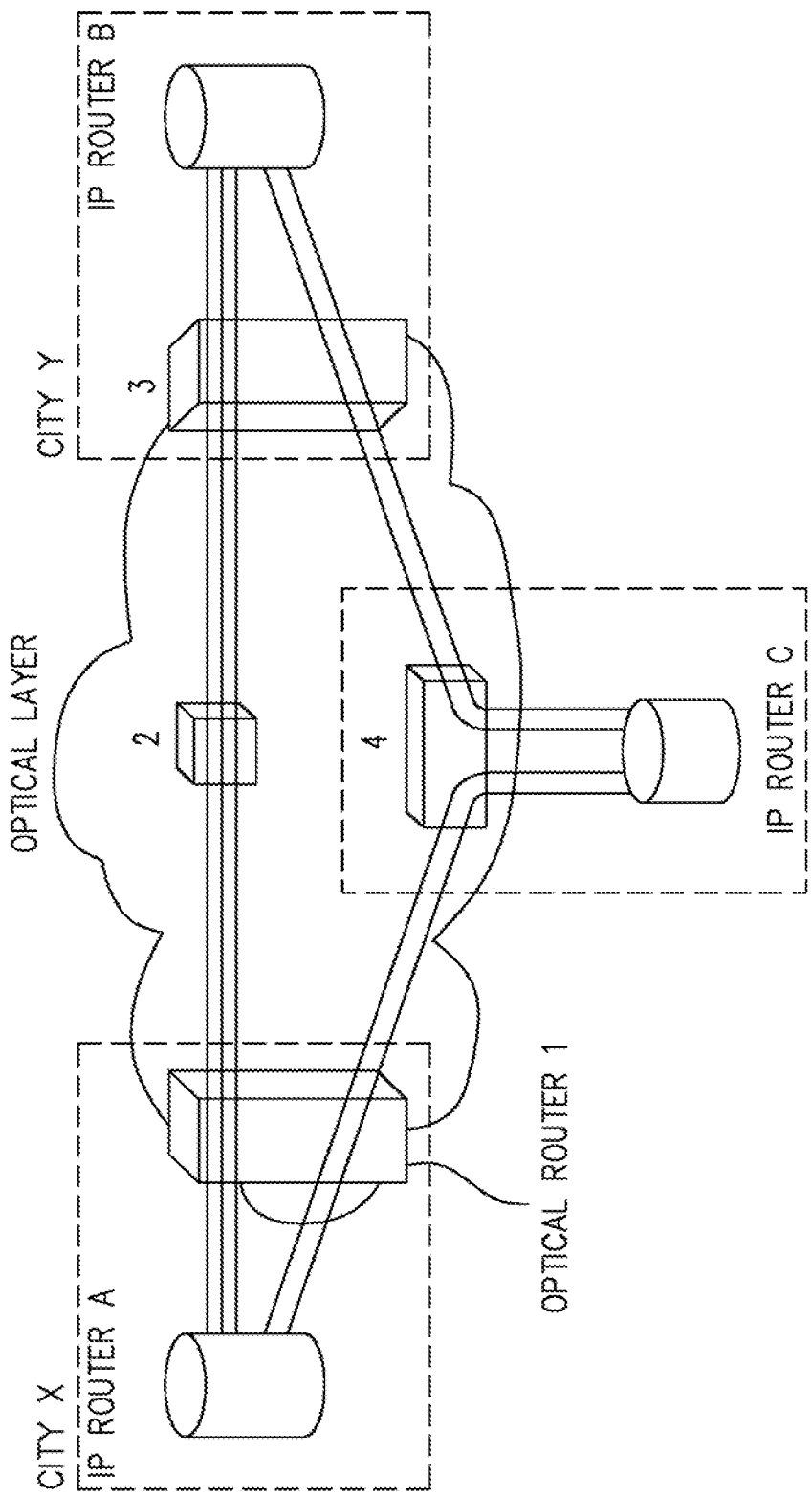
FIG. 11 illustrates one approach for mapping IP ports to optical ports in a multi-layer communication network.
Figure 12A:
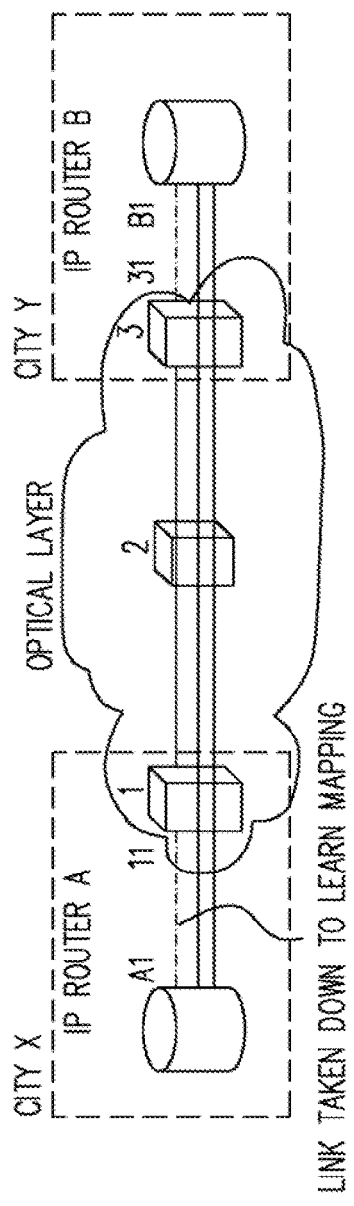
FIGS. 12a-c illustrate another approach for mapping IP ports to optical ports in a multi-layer communication network.
Figure 12B:
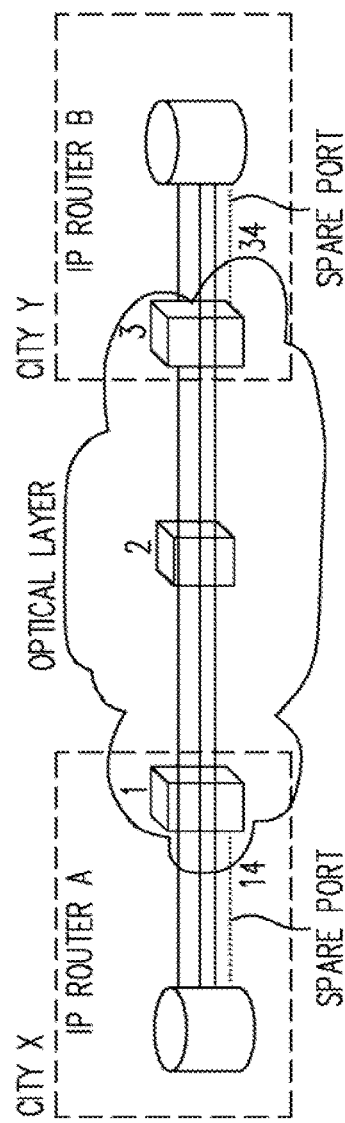
Figure 12C:
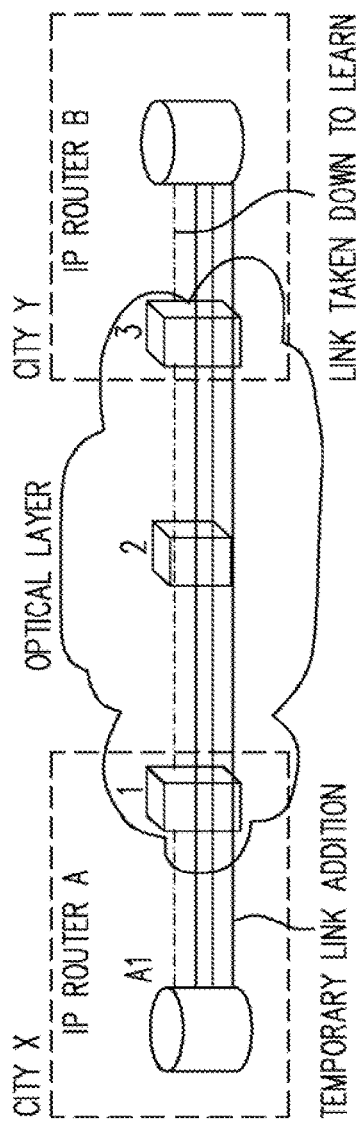

FIGS. 11-12c illustrate several mapping approaches that can be used by the present system.

One approach for mapping IP and optical layer ports is based on comparing the source and destination of links in the IP layer and connections in the optical layer.

Referring to FIG. 11, the approximate mapping of ports between IP router A and optical router 1 in city X can be deduced by following the path of the 3 optical connections between optical router 1 and 3, and realizing that there are 3 IP links between router A and B with the same city pairs X and Y. Such approximate (or "fuzzy") mapping is often sufficient for the operation of the present system, or can be used as a way to restrict the manual configuration choices of the operator—by offering them options only from within the relevant subset. Moreover, when the optical route of these links is the same (as is often the case), the system can compute the impact of a failure of an optical link along that path without knowing the accurate mapping since all these links will fail at the same time. This allows the system to assess the required backup capacity in the IP layer or in the optical layer and to perform impact analysis for the user. In addition, if the capacity of the links in the bundle is the same, then the system can further assess the impact of a failure of a single port in the bundle for purposes of impact analysis, or the impact of failure of K out of N links of the bundle (for example if a component that supports only the K links of the bundle fails).

FIGS. 12a-c illustrate an approach for more accurately mapping a port on an IP router A to a port on optical router 1 based on measuring the traffic in the link bundle between IP routers A and B. When traffic demand is low, a member of the bundle can be removed with out negatively impacting communication (FIG. 12a). This can be effected by configuring an unmapped IP router port A1 and unmapped IP router port B1 (mapping between A1 and B1 is known to the routers). Optical link (laser) can then be turned off on port A1 to observe which optical port sends an alarm on loss of light (port 11 shown). This enables to map the IP router port to the optical port. Turning off the laser on the remote optical port for the same connection (port 31 shown) provides a similar indication for router port B1.

Mapping between ports 11 and 31 is known to the optical layer, and thus this process guarantees that only 1 link between the routers is affected—even during misconfigurations. This procedure establishes mapping between port A1 and port 11 and between port B and port 31. Now, at B1, the laser is turned off towards port 31. If port B1 is connected to another optical port, say 32, then 32 will issue an alarm, discovering the discrepancy, but this will still only affect a single bidirectional IP link—between port A1 and B1.

While the order described above ensures minimal disruption, a less optimal orders of actions can also be practiced using the present invention. Once the complete mapping between ports A1 and 11 and between port B1 and 31 is discovered, the ports are turned on again.

An alternate approach relies on spare router ports connected to spare optical ports as shown in FIG. 12b. In this case, a spare link between routers A and B can be established by setting up a connection between optical ports 14 and 34 as shown in FIG. 12c. Once the spare link is up, it is added to the link bundle between routers A and B, followed by the removal of the link between A1 and B1. Once the link is removed, the aforementioned process of discovering the mapping is followed. The advantage of this approach is that it can be performed even when the traffic across a link bundle does not allow for removing a link.

Yet another approach for mapping can be effected by removing a client port of a link in a multi-link bundle interconnecting two nodes of the client layer. Such removal—which can be effected by switching off a port or by taking the port out of service—is performed under conditions in which a capacity of the multi-link bundle exceeds communication traffic demand between the two nodes of the client layer, following removal. Once the port is removed, the system identifies a server port of the server layer that loses communication and thus maps the client port to the server port.

The following can be used to remove a client port and map a client port to a server port:

Given a list of unmapped router ports and unmapped optical ports, pick a router port X that is part of bundle Y Measure the current traffic amount on the bundle by observing the incoming and outgoing packet or octet counters on the bundle (e.g. by querying the router using the SNMP protocol)

Calculate if this traffic amount can still be carried by the bundle should the link be removed from it. For example, if the bundle has N links, each with capacity of Z Gb/s, and the current traffic amount in the bundle is Y Gb/s, Then the link can be removed if $Y<U*(N-$ 1)*Z, where 0<U<1 represents the maximum allowed utilization in a bundle per the operator's policy.

Remove the link from the bundle, by putting port X in maintenance mode, or turning its laser off or by reconfiguring the bundle at the routers at both ends.

Optionally check that port X no longer carries traffic by observing the incoming and outgoing packet or octet counters on the port (e.g. via the SNMP protocol)

Turn off the laser on port X

Check which of the optical ports at the same site is no longer seeing incoming light. This can be done by polling all the ports and observing which of them has an indication that it is not receiving light from the client, and comparing this to their recent state (the same polling can be done just before turning off the light laser on port X). Only the optical port M that is mapped to X should experience a state change. Another option is to subscribe to alarms for the optical gear and look for a loss of light (LOL) alarm from an optical port M.

The system will record in its database that port X and M are mapped

Port X is turned on and returned to service and back into the bundle

The process repeats for all remaining unmapped ports

FIGS. 13-16 illustrate still another approach for mapping connectivity between layers or domains of a multi-layer network.

Figure 13:
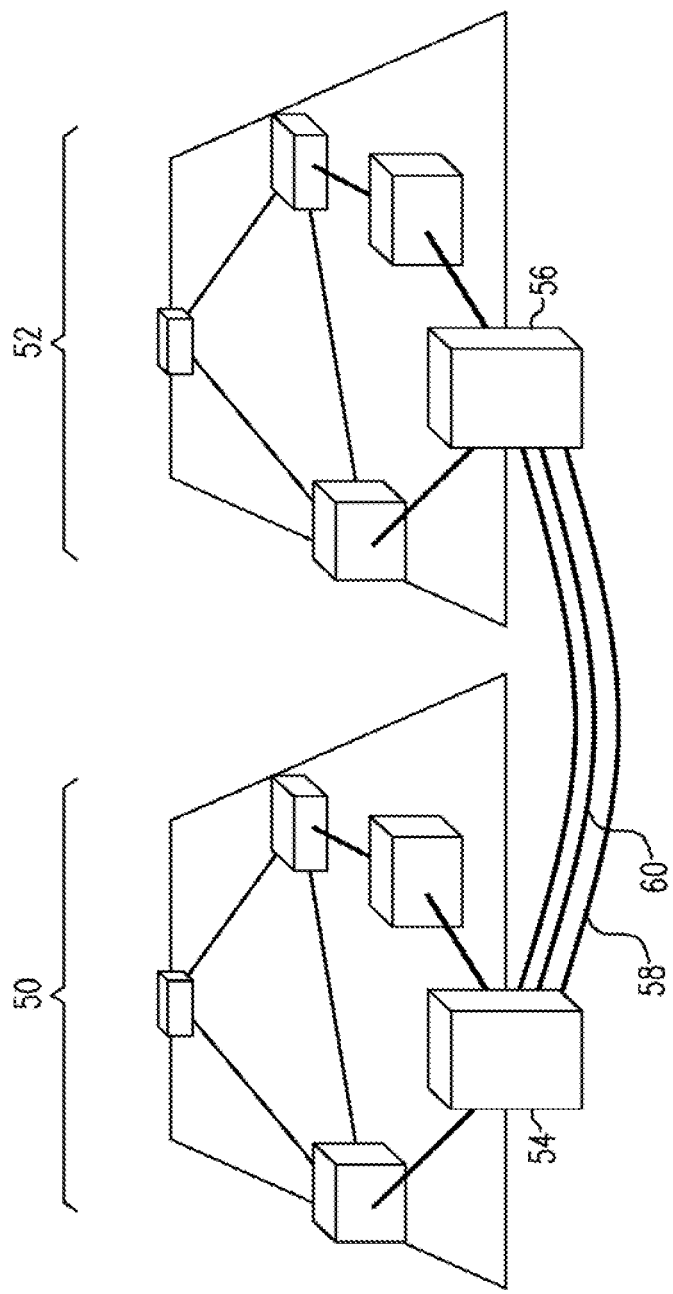
FIG. 13 illustrates interaction between the various components of the present multi-domain network.

FIG. 13 illustrates a network which includes domains 50 and 52. Each domain may be managed separately and the links connecting these domains may not be fully managed. It is therefore important to automatically find out how these links are connected. An example of this is two optical domains 54 and 56 connected via Ethernet interfaces 58 and 60 which do not automatically support discovery of connectivity.

In order to map client and server layer ports, the present system utilizes some or all of the following information collected from the multi-layer network:

(i) network topology of each layer—nodes and the links interconnecting the nodes in the layer;

(ii) end to end connections in the server layer;

(iii) documented maps of interconnects between line-side ports of the client layer and respective ports in the server layer, should this information exist from another source—such as an external database or link management protocols; and (iv) traffic statistics at the ingress and egress ports of each layer, such as packet count or byte (octet) count.

(v) alarms about loss of connectivity (or loss of light) on the line-side ports of the client layer and respective ports in the server layer This information is utilized by the present invention to identify and verify actual interconnects between line-side ports of the client layer and respective ports in the server layer and generate a map of such interconnects.

The above information (i-v) collected by the system of the present invention can be obtained via various network layer protocols (such as IGP or BGP-LS for topology and Netflow or Simple Network Management Protocol [SNMP] counters for traffic measurements, or NETCONF), management systems (e.g., Alcatel's SAM) or centralized controllers for each of the layers (e.g. Cisco's WAE or Juniper's Northstar), or planning tools (e.g., Cisco's MATE design), or network data collection tools (e.g., MATE collector).

Figure 14:
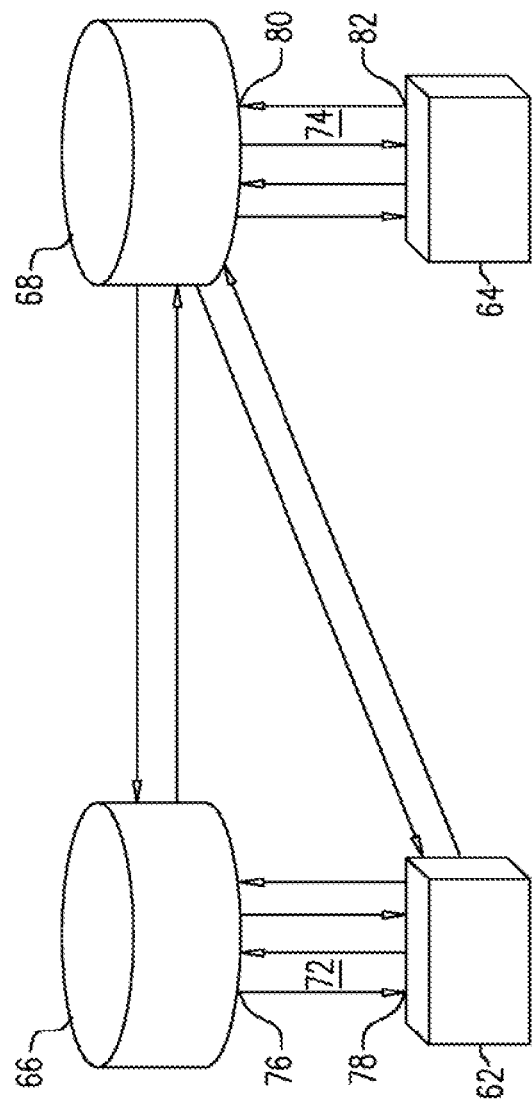
FIG. 14 illustrates interaction between the various components at a single site of a multi-layer network.

The system collects information for each site which includes server and client nodes (62 and 64 and 66 and 68 respectively, FIG. 14). The System may also obtain some information about the interconnections between layers, e.g., bidirectional interconnects 72 and 74 (each including two unidirectional links).

Figure 15:
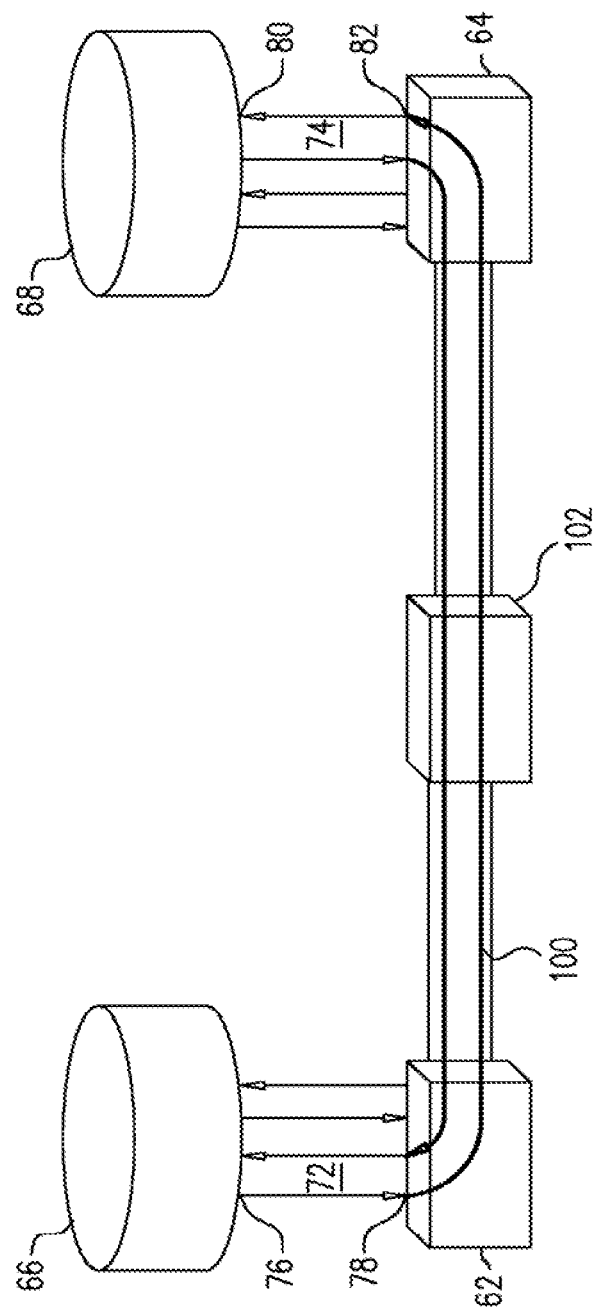
FIG. 15 illustrates interaction between the various components along an optical connection in a multi-layer network.

The System starts collecting traffic counters and statistics for each ingress and egress port on the server layer and the client layer (e.g. ports 76, 78 and 80 and 82 shown in FIG. 14). Such counters (providing Ethernet packet count or byte count or a distribution of packet count as a function of packet size) exist on the client packet layer interfaces at both ingress ports 76 and egress ports 80. In the server (e.g. optical) layer, such counters exist on many of the Ethernet ingress ports 78/82, for example in some of the Cisco ONS 15454 transponders. Counters may or may not exist on egress ports of transport gear, but they can be accurately derived since the traffic behavior for a given timeframe on an ingress port 78 of a first optical server 62 is identical under normal circumstances (no failures) to the traffic behavior for the same timeframe on the egress port 82 of a second optical server 64, provided that an optical connection 100 connects these two ports (FIG. 15).

These counters are collected by the system at approximately the same time from several ports of a given site. Since different ports will typically carry different amount of traffic at different points in time, it is possible to correlate the traffic behavior as measured by the counters and deduce which traffic behaviors match and likely represent connected ports.

The traffic behavior is typically based on the change in traffic (the delta) from the last measurement of the counters. Counters can also be based on absolute value of the counters, but the algorithm must take into account the fact that some counters may be reset by an operator. The behavior can be based on different types of counts, such as total packet count, total byte count, or a distribution of packet count as a function of packet size—as defined by the Remote Network MONitoring (RMON) management information base (MIB) standard for SNMP. A more accurate correlation can be achieved by combining different types of counters. Sampling of counters can be effected periodically on all ports in order to have enough deltas for comparison. In any case, the mapping approach must be robust enough to provide accurate values and discount temporary inconsistencies due to failures that may affect packet counts, or a manual reset. Such approaches can utilize packet count information to generate graphs of packet counts over time and to model the graph or to identify and compare traffic patterns such as trends, spikes, local maximum and local minimum points, monotonic increase or monotonic decrease in the packet count, etc. Modeling approaches can be based on finding a slope or polynomial curve that is as close as possible to the measured points for a given port (using the min-square approach) and finding polynomials for different ports that have matching coefficients. Such approaches are described in greater detail hereinbelow and in Example 3 of the Examples section which follows.

In cases where traffic measurements through a link do not allow for a robust mapping algorithm or the interconnected ports are not part of an active client layer link and thus the counters do not collect enough information for mapping, the system of present invention can also be used in conjunction with actively generated control traffic.

Such an approach can also be used as a tie-breaker, if a correlation function cannot differentiate between several client-server connectivity options. To actively generate traffic, the system causes a router to send a repetitive ping with large packets from the egress router port (76 in FIG. 15) to a remote ingress router port 80 through link 100, which is optically routed via nodes 62, 102, and 64. For example, the command 'ping-n1000-160000' will generate 1000 messages, each 60000 bytes long. This traffic will be reflected in the counters of one port, both on the IP routers and the connected optical servers.

Traffic counters can also be used to discover interconnects between domains, i.e. for cross-domain mapping. The general process is similar to that described above except that the traffic counters are read from the cross-domain interfaces, namely the interfaces of links 58 and 60 between nodes 54 and 56 in FIG. 13. If generation of ping messages is needed as described above, then multi-domain mapping will require access to the routers, which requires multi-layer support in addition to multi-domain support. If some cross-domain optical links are not part of an active IP link, the present system can create a temporary IP link that will use the inactive cross-domain optical link, generate ping messages on it, and then take the IP link down. This temporary IP link will not be added to the IP layer network topology (IGP) and will not be used for real traffic.

Correlation of counters of various ports can be effected using the following approach. Referring to the N×N port configuration system shown in FIG. 16, the goal is to find accurate mapping between each one of the N ports at left hand side denoted by $X_k$ (k=1, 2, ..., N) to the ports at the right hand side denoted by $Y_p$ (p=1, 2, ..., N).

For every port, the notation $X_k[n]$ (k=1, 2, ..., K), means the signal values as it was sampled at time t[n], where n=1, 2, ..., N. $Y_p[n]$ is defined in a similar fashion.

The signal $X_k[n]$, $Y_p[n]$ represent packet counters as well as any other time dependent parameter. The algorithm in this example includes 4 step:

Step 1:
Calculate the derivative for each of the above signals $X_k[n]$ and $Y_p[n]$. A derivative of a sampled signal value can be defined as:

$$p'[n] = \frac{p[n] - p[n-1]}{t[n] - t[n-1]} (2 \leq n \leq L) \quad \text{(Equation 1)}$$

Where p[n] is the counter samples and t[n] is the time when the samples were taken.

A derivative is used since traffic changes come in bursts, and a derivative allows detection of those changes.

Step 2:
Optional (based on the noise level)—Smooth the results using a moving average filter—order of 3 (for example):

$$\tilde{Q}[n] = \frac{1}{3}[P'[n-1] + P'[n] + P'[n+1]] \quad \text{(Equation 2)}$$

Step 3:
Calculate cross-correlation between each pair of signals/ports, the cross-correlation can be defined by one of the following formulas:

$$\hat{R}_{X'_k Y'_p}[m] = \begin{cases} \frac{1}{N-m} \sum_{n=0}^{N-m-1} X'_k[n+m] Y'_p[n] & m \geq 0 \\ \hat{R}^*_{Y'_p X'_k}[-m] & m < 0 \end{cases} \quad \text{(Equation 3)}$$

OR $$\hat{R}_{X'_k Y'_p}[m] = \begin{cases} \frac{1}{N} \sum_{n=0}^{N-m-1} X'_k[n+m] Y'_p[n] & m \geq 0 \\ \hat{R}^*_{Y'_p X'_k}[-m] & m < 0 \end{cases} \quad \text{(Equation 4)}$$

Where R*[n] represents a conjugate match value in the case of a complex signal. For a real value signal: R*[n]=R[n]

By default the first formula can be used, however, in case of a strong noise the second formula can be used to improve the results.

Figure 16:
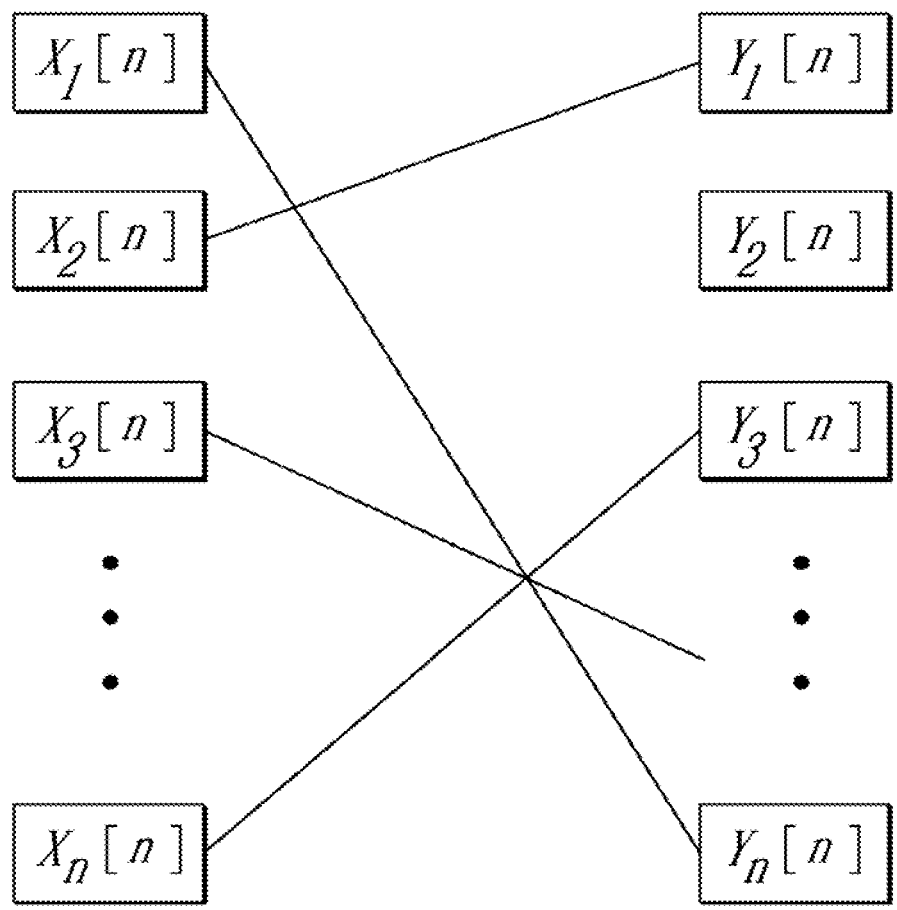
FIG. 16 illustrates an example of cross layer or cross domain port connectivity.

Following this step, one obtains N cross-correlation signals for every port at the left side of FIG. 16, and in total: N×N=N² signals/vectors.

Step 4:
For every port $X_k$ (k=1, 2, ..., N) find an associated port $Y_p$ (p=1, 2, ..., N) calculate the maximum value of the cross-correlation and compare it to a predefined threshold.

Link information which does not rely on packet counters can also be used for mapping. For example, the present system can reduce the transmit power at one end of a cross-layer link and sense the change in received power at the other end of this link. As long as the change in power is small, this is a non-intrusive event.

Link latency can be sensed by both optical gear and IP gear and also used for mapping. For example, when the IP layer uses fast connectivity check and connectivity verification messages (CC/CV—as defined in the MPLS-TP standard), the latency can be accurately assessed. Once a latency assessment exists for both optical connections and IP links, the system will find the closest match in latency to identify which IP link matches which optical connection.

A correlation of failures in both layers—based on either current failure information or historical failure information or a combination of both—can also be used for mapping. The present system looks for failure indications such as alarms or syslogs that occurred at roughly the same time at both the optical layer and the IP layer. When an optical connection fails, its supported IP link fails as well and this indicates a likely mapping between the two.

As used herein the term "about" refers to ±10%.

Additional objects, advantages, and novel features of the present invention will become apparent to one ordinarily skilled in the art upon examination of the following examples, which are not intended to be limiting.

EXAMPLES

Reference is now made to the following examples, which together with the above descriptions, illustrate the invention in a non limiting fashion.

Example 1

Network Restoration

Figure 10:
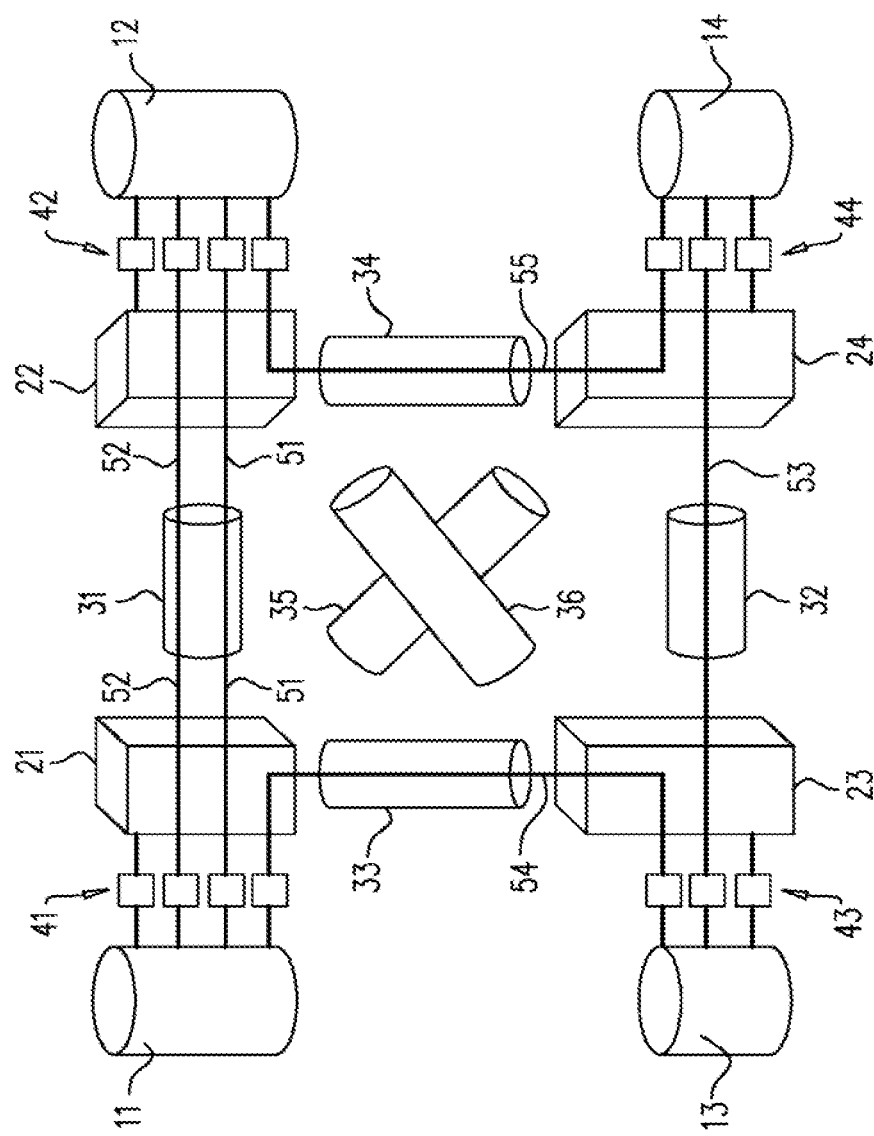
FIG. 10 illustrates a multi-layer network showing connectivity between the optical and IP layers.

The network illustrated in FIG. 10 includes 4 IP routers 11-14, 4 ROADMs (optical routers) 21-24, 4 spare router ports connected to the optical layer 41-44, and 6 optical links 31-36.

The length of optical links 31-34 is 10 km while link 35 is 50 km long and link 36 is 40 km long. Upon failure of link 31, IP links 51 and 52 fail. The shortest alternate optical path for these IP links goes through optical links 33, 32 and 34 (30 km). However, this path will force IP link 51 and 52 to share optical links with IP links 53-55, compromising the network in an event of another optical failure. Such a compromise may violate the IP layer policy of the service provider. The alternate path (33, 32, 34) is a likely choice for pure optical restoration since the optical layer is not aware of the diversity needs of the IP layer.

The present system will identify the path through optical links 35 and 34 as the better alternative since the resulting IP links will only share an optical ink with IP link 55. The present system will therefore configure the optical layer to restore the optical paths supporting IP links 51 and 52 to use the restoration path (35, 34). If the operator also has a latency constraint for an IP link, which translates to a maximum distance of 40 km, then the present system will prefer an alternate path of (33, 36) instead. In the event that a failure takes down optical links 31 and 36. Optical restoration will attempt to restore IP links 51 and 52 through optical path (33, 36), but this path will be down. Failure of restoration will be reported to the present controller, which will then force other options: path (33, 32, 34) or path (35, 34). Depending on whether the operator prioritizes diversity over low latency or vice versa, the present controller will request the optical layer to set up alternate paths (35, 34) or (33, 32, 34) respectively.

When a router port fails—e.g. the port on router 11 connecting to link 51—the present system will receive an alarm and identify a spare port 41. It will shut down the failed port and copy the salient IP configuration data (such as the IP address, the routing metric, and the link bundling data) to port 41. It will then request the optical layer to reconnect the failed path supporting link 51 to port 41 instead of the failed port. Once the link is up, traffic will start flowing and the failed capacity will be restored.

Referring again to FIG. 10, it may be unclear whether the optical path implementing IP link 51 connects to the $2^{nd}$ port from the top on routers 11 and 12 and IP link 42 connects to the $3^{rd}$ ports on both routers, or vice versa. To map connectivity, the present system waits until the traffic level between routers 11 and 12 is low enough to be supported via a single link. Subject to operator defined policy (e.g., "only perform such actions in the middle of the night"), the present controller removes link 52 from the link bundle between these routers. The controller can then shut down the IP port on router 11 connecting to link 52. As a result, the optical port connecting to this port will issue an alarm on a loss of light which will provide an indication of ports interconnectivity. The present controller will then instruct the optical port at the other end of the optical path to shut off its port. As a result, the IP port on router 12 will issue an alarm on loss of light. This will establish how the ports are mapped at the remote end. The process is repeated in the other direction (from router 12 to 11) to establish the mapping in the inverse direction. Once the process is finished, link 52 is put back in service and added into the link bundle. The mapping process can now proceed to discover other links (for example, link 51). Discovering how the IP ports of link 53 connect to the optical ports is more challenging, since taking down a single link will adversely affect traffic. Therefore, spare ports 43 and 44 are used to set up a new temporary link between routers 13 and 14, once it is up, it is bundled with link 53. Subsequently link 53 is taken out of the bundle—this does not affect traffic since it can now use the newly added link. The process of turning off ports is repeated here, after which link 53 is put back into service and the spare ports 43 and 44 are freed up again.

Example 2

Applying Traffic Engineering (TE) Metrics in Network Restoration

One approach for restoration described hereinabove assumes that the IP layer at restoration does not reroute traffic that is not suitable for the newly established restoration path.

In order to ensure that services with a low latency requirement retain the required latency while the network is using longer optical paths when restoring some IP links, restoration of IP layer traffic can be effected along with modification of traffic engineering (TE) metrics, such as the latency of the link for the restoration path. This ensures that if latency of the restoration path of an IP link is too high, the routers will become aware of this change, and this link will not be used for latency-sensitive traffic. A similar approach can be used for the cost of the restoration path. If the cost increases due to routing through regenerators, or due to the increased length of restoration path, then the pertinent link metric must be modified, and traffic that can avoid high cost links will do so.

An example for the behavior of latency-sensitive traffic is illustrated in FIGS. 17-18c. The network shown in these Figures includes similar-length optical links 140 (optical fiber) connecting server routers 120 [reconfigurable optical add-drop multiplexer (ROADM)] and IP links 130 connecting clients routers 110 over the optical path. The network configuration shown in this example supports a service that can tolerate a latency of up to 4 optical links.

Figure 18B:
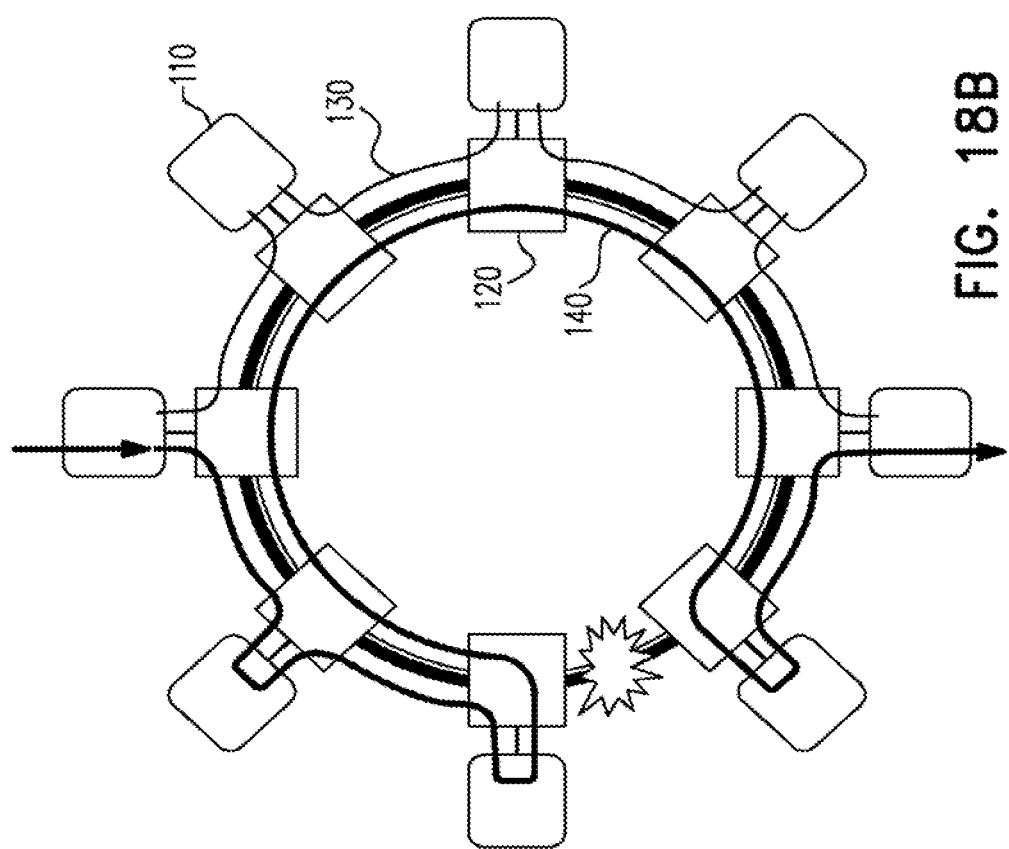

FIG. 18a-c illustrate how such a service is routed over this network under normal conditions in (FIG. 18a), and its routing over the network after the optical recovery from a failure (FIG. 18b), assuming it takes the same IP layer path. This is OK for non-latency-sensitive traffic, however if the max latency is 4 hops, then the IP layer should route the service over a different IP path (FIG. 18c).

Example 3

Port-Matching Via Traffic Count

Several approaches can be used to match client and server ports based on traffic counts through these ports. A group of N client and server ports is selected and samples are collected from these ports at fixed intervals. Two types of traffic counters can be used:
 (i) Counters of the number of packets on the port; and/or
 (ii) Counters of the number of bytes (octets) on the port.

The collected samples are pre-processed to verify that there is a sufficient number of samples for the algorithm. Gaps caused by missing samples are filled via, for example, interpolation. Sampling periods with decreasing samples values caused by, for example, manual reset of counters are ignored and byte counters for equipment that does not count some of the packet headers are adjusted accordingly. A "match value" that represents the likelihood of a match between every pair of ports, is then calculated according to one of the following approaches:
 (i) slope estimation-based on the global trend of the samples;
 (ii) model fitting-based on the global trend of the samples; and
 (iii) pattern detection-based on local phenomena in the graph (e.g. burst of counter activity detected as a spike on the graph).

Figure 19:
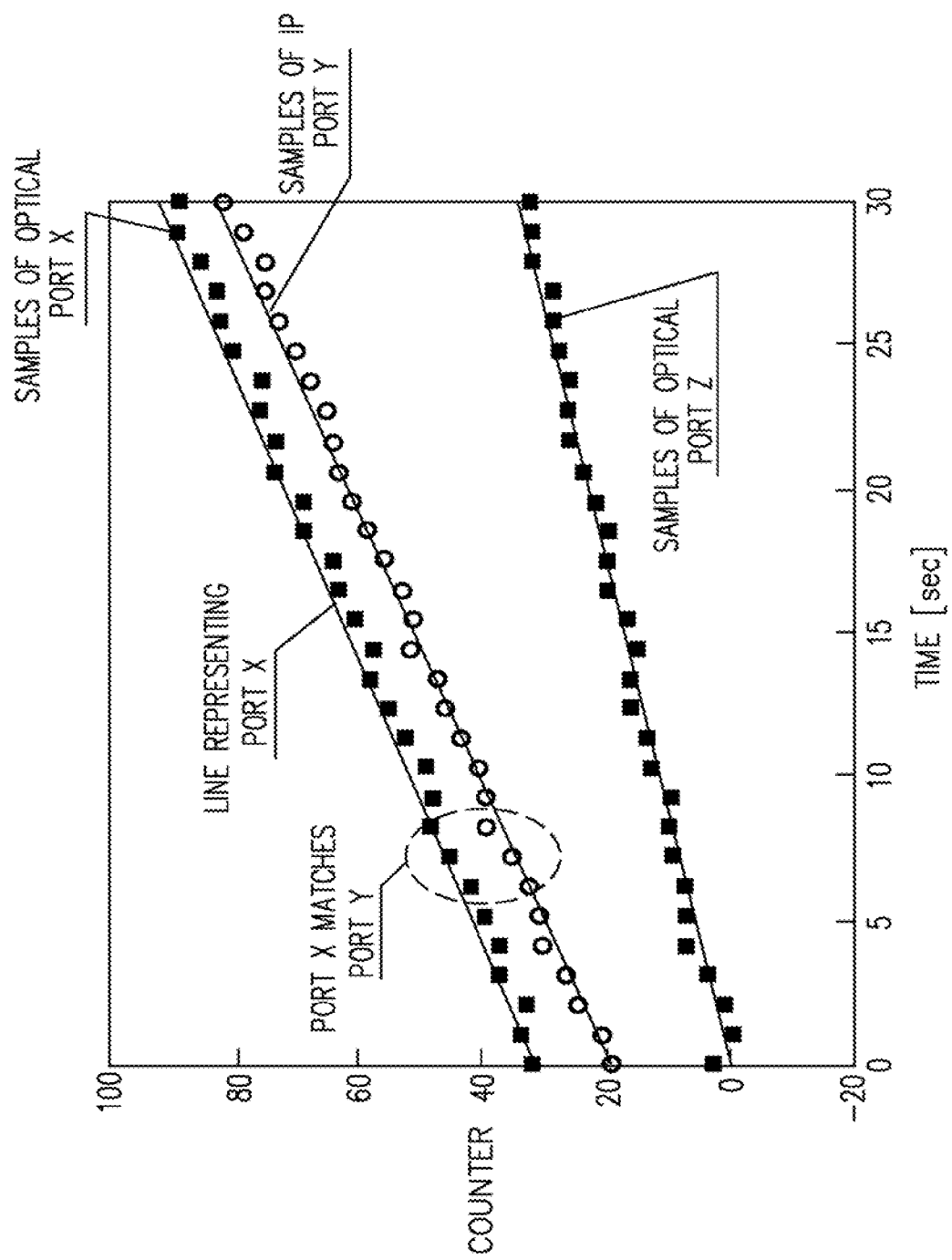
FIGS. 19-21 are graphs illustrating three approaches for port matching according to the teachings of the present invention.

The processed samples of pairs of client and server ports are then compared to find a match. Comparison can be absolute, e.g. the match value of each port pair is compared to a fixed absolute threshold or relative, e.g. the match value for different port pairs are compared and a best fit amongst all pairs is identified as a likely match.
(i) Slope Estimation FIG. 19 is a graph illustrating slope estimation for three ports: port X, port Y and port Z. The samples taken from a port are graphed with the x-axis representing the time the sample was taken and they axis representing the absolute value of the counter (packet count or byte count). A straight line closest to the samples of each port is then determined, and its slope is calculated. The slopes of lines representing different ports are compared to identify matching pairs.

As can be seen in FIG. 19, the straight line that passes closest to the samples of optical port X and the straight line that passes closest to the samples of IP port Y are of a similar slope, thus it may be determined that optical port X and IP port Y are a matching pair. Furthermore, it may be determined that the slope associated with the straight line that passes closest to the samples of optical port Z is different from the slope associated with optical port X and from the slope associated with port Y, thus it is determined that optical port X and IP port Z are not a matching pair, and similarly, IP port Y and optical port Z are not a matching pair.

(ii) Model Fitting

Figure 20:
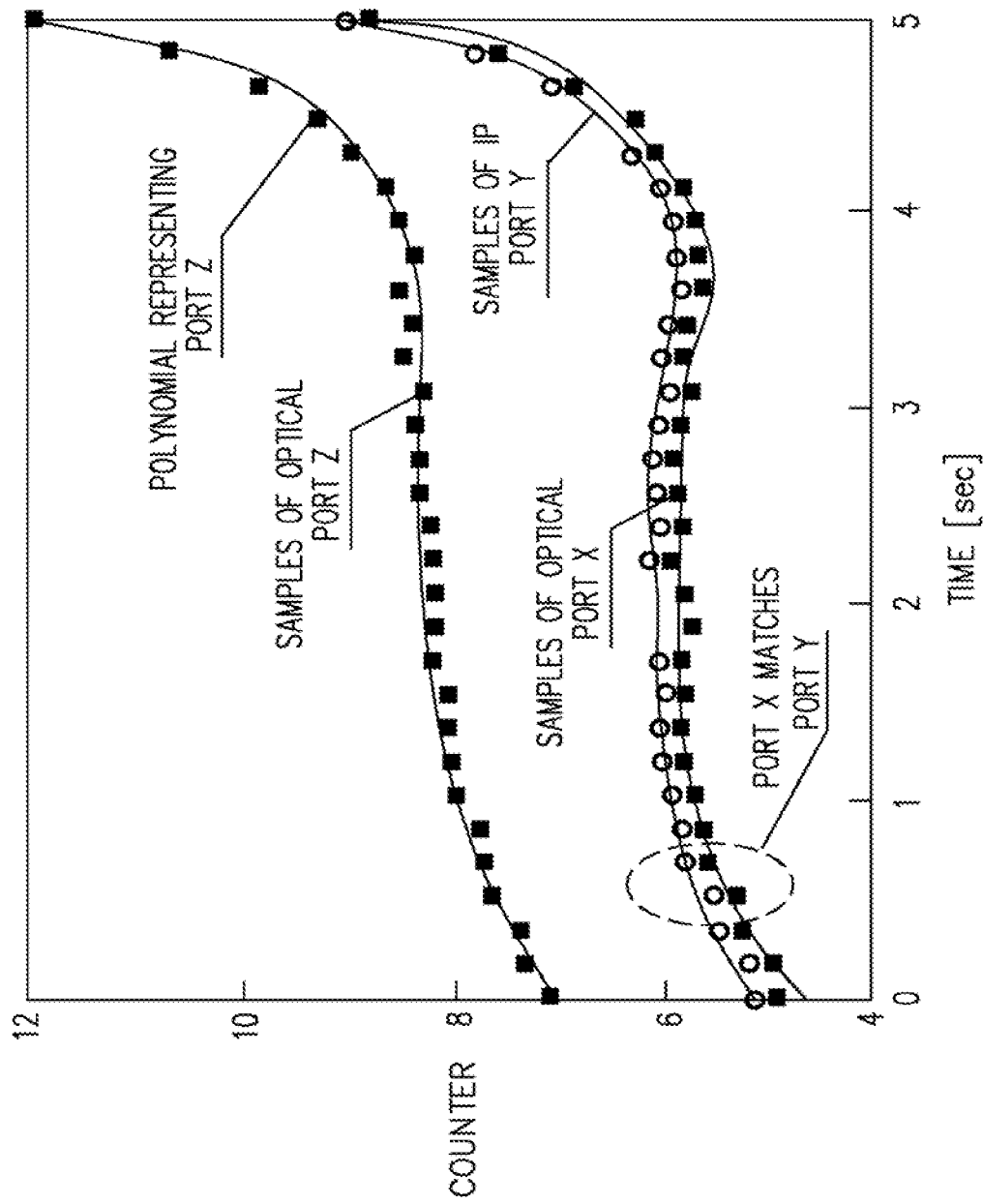

FIG. 20 is a graph illustrating model fitting. The traffic samples taken from a port are graphed with the x-axis representing the time the sample was taken and the y axis representing the absolute value of the counter (packet count or byte count). A polynomial of a degree N closest to the samples of each port is then identified, e.g. using model fitting as described above, and this polynomial represents a model for the port. The similarity between the models representing a pair of ports is quantified, for example by calculating the average difference between the y values for the two models at a plurality of points along the x axis. This difference value is used for determining a match between a pair of ports; the smaller the difference value, the more likely the pair of ports are matched. The graph in FIG. 20 shows three polynomial lines representing three ports. The top line that represents optical port Z is distanced from the two lines that represent optical port X and IP port Y. Calculating the difference value for optical port X and IP port Y may provide a low value, indicating that these polynomial models are a matching pair.

(iii) Pattern Detection

Figure 21:
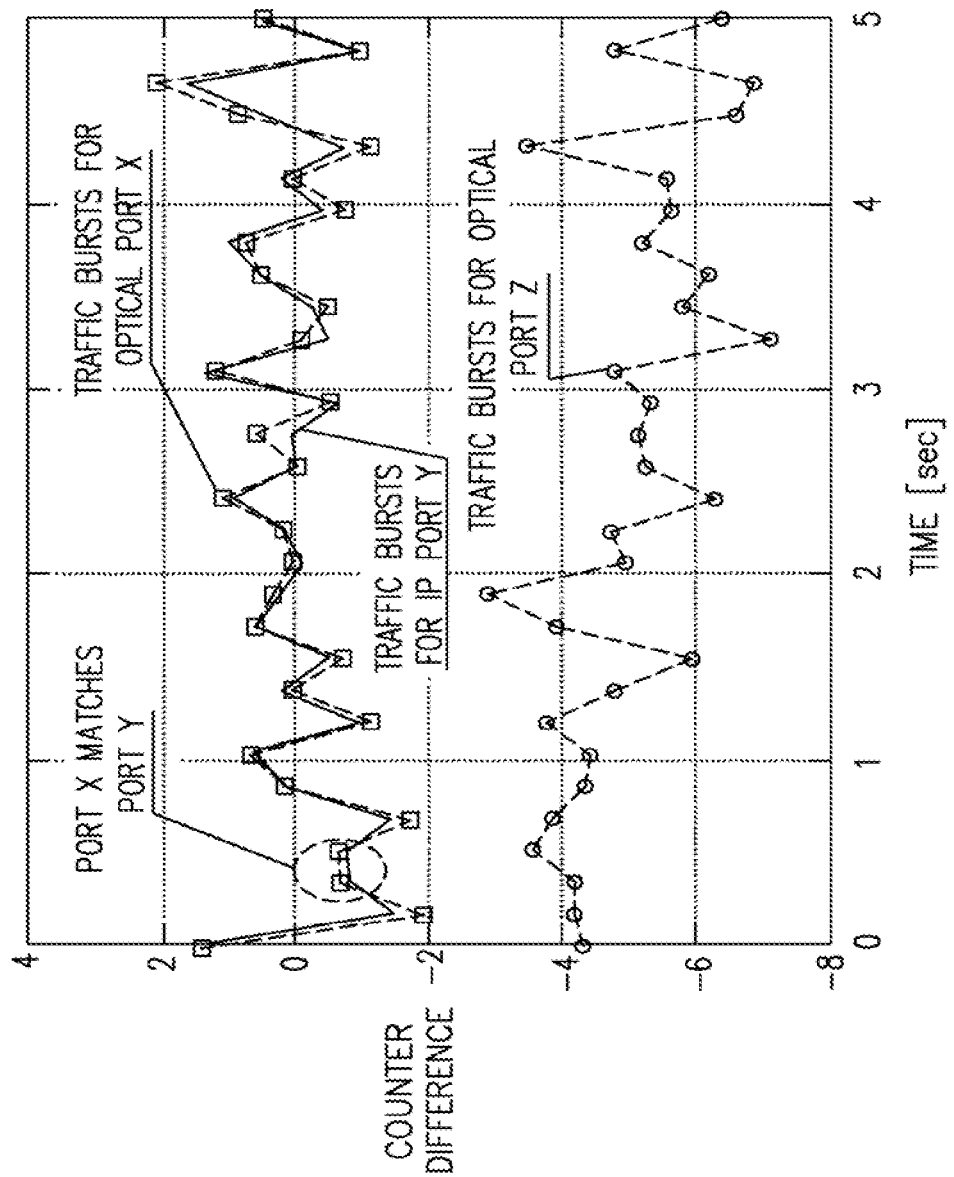

FIG. 21 illustrates pattern (or burst) detection. The samples taken from a port are graphed with the x-axis representing the time the sample was taken and the y axis representing the difference in counter value from a previous measurement (packet count or byte count). The location of bursts in packet or byte count over time is identified (as spikes on the graph) for each graph of port samples and a low-pass filter (smoothing out the curve) is optionally applied to account for bursts that are shifted in time due to measurement limitations.

The burst patterns are correlated for each pair of ports, and a match is identified if the correlation value that indicates a degree of correlation is sufficiently high (e.g., above a predetermined threshold). An auto-correlation function may be used to determine the correlation value between each pair of ports, for example by calculating a cross-correlation between each pair of signals/ports using equations 3 and 4 above.

In FIG. 21, traffic counts from three ports is indicated in the graph. Traffic bursts for each port are connected by a line in the graph, and the lines are checked to determine the correlation between each pair. As can be seen from the graph, the lines of optical port X and IP port Y are very close and thus highly correlated. The line connecting the traffic bursts for optical port Z is distanced from the lines connecting the traffic bursts of ports X and Y, and there is a low correlation between optical port X and IP port Z, as well as between IP port Y and optical port Z.

Additional examples of patterns that can be identified and compared by the system of the present invention include up or down trends in traffic activity and combinations thereof including sawtooth and patterns of repeating increasing/decreasing (up/down) trends in the graph.

In the context of some embodiments of the present disclosure, by way of example and without limiting, terms such as 'operating' or 'executing' imply also capabilities, such as 'operable' or 'executable', respectively.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a non-transitory computer-readable medium having the software instructions stored therein. The computer-readable medium may be for example RAM, ROM, or disk, or embedded in a circuitry operationally accessible and executable by an apparatus such as a processor or other circuitry.

The processor and program may constitute the same apparatus, at least partially, such as an array of electronic gates, such as FPGA or ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components. As used herein, without limiting, a process represents a collection of operations for achieving a certain objective or an outcome.

As used herein, the term 'server' denotes a computerized apparatus providing data and/or operational service or services to one or more other apparatuses. The terms 'configuring' and/or 'adapting' and/or 'determining' and/or 'calculating' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for mapping a multi-layer communication network having an optical layer and an internet protocol (IP) layer, the system comprising a controller configured to execute instructions for:
   (a) removing an optical port of an IP node in a multi-link bundle interconnecting two nodes of the IP layer, said removing being under conditions in which a capacity of said multi-link bundle exceeds communication traffic demand between said two nodes of the IP layer, following said removing; and
   (b) identifying an optical port of the optical layer that loses communication thereby mapping said optical port of the IP node to said optical port.

2. The system of claim 1, wherein said removing is effected by switching off said optical port of the IP node.

3. The system of claim 1, wherein said loss of communication in said optical port is indicated by a traffic counter within an optical node comprising said optical port.

4. The system of claim 1, wherein said conditions are created by the system, by first adding a new link between said two nodes using existing router interfaces and sharing traffic load over said link.

5. The system of claim 4, wherein the system creates an additional link in said multi-link bundle thereby increasing said capacity of said multi-link bundle to exceed said communication traffic demand.

* * * * *